US012621650B2

(12) United States Patent
Rao et al.

(10) Patent No.: US 12,621,650 B2
(45) Date of Patent: May 5, 2026

(54) DYNAMIC DEVICE CAPABILITY FOR MULTI-SIM/ESIM WIRELESS DEVICES DURING OUT-OF-SERVICE SCENARIOS

(71) Applicant: Apple Inc., Cupertino, CA (US)

(72) Inventors: Amithananda Rao, Munich (DE);
Karthik Ramamurthy, Bangalore (IN);
Zeba Patheria, Unterhaching (DE)

(73) Assignee: Apple Inc., Cupertino, CA (US)

( * ) Notice: Subject to any disclaimer, the term of this patent is extended or adjusted under 35 U.S.C. 154(b) by 436 days.

(21) Appl. No.: 18/326,989

(22) Filed: May 31, 2023

(65) Prior Publication Data

US 2024/0406708 A1 Dec. 5, 2024

(51) Int. Cl.
*H04W 8/18* (2009.01)
*H04W 8/00* (2009.01)
*H04W 88/06* (2009.01)

(52) U.S. Cl.
CPC ........... *H04W 8/183* (2013.01); *H04W 8/005* (2013.01); *H04W 88/06* (2013.01)

(58) Field of Classification Search
CPC ...... H04W 8/183; H04W 8/005; H04W 88/06
See application file for complete search history.

(56) References Cited

U.S. PATENT DOCUMENTS

| | | | |
|---|---|---|---|
| 2012/0264425 A1* | 10/2012 | Krishnamoorthy ... | H04W 48/16 455/434 |
| 2013/0189985 A1* | 7/2013 | Mutya ............... | H04W 52/0254 455/436 |
| 2014/0274047 A1* | 9/2014 | Dhanda ............... | H04W 68/005 455/458 |
| 2015/0011236 A1* | 1/2015 | Kazmi ................ | H04W 52/365 455/456.1 |
| 2015/0017968 A1* | 1/2015 | Kaikkonen ............. | H04W 8/20 455/418 |
| 2016/0142087 A1* | 5/2016 | Inampudi .............. | H04W 48/16 455/558 |

* cited by examiner

*Primary Examiner* — Michael K Phillips
(74) *Attorney, Agent, or Firm* — DICKINSON WRIGHT RLLP

(57) ABSTRACT

The described embodiments relate to wireless communications, including methods and apparatus for dynamically adjusting device capability of a device that includes multiple subscriber identity modules (SIMs) and/or electronic SIMs (eSIMs) during out-of-service scenarios. A multi-SIM/eSIM wireless device can include at least two SIM/eSIM profiles that each provide access to cellular wireless services. When an active SIM/eSIM profile enters an out-of-service (OOS) state or exits an OOS state, the multi-SIM/eSIM wireless device dynamically updates device capabilities to re-allocate device resources to one or more active SIM/eSIM profiles not in the OOS state to improve device performance. Device capabilities for the one or more active SIM/eSIM profiles not in the OOS state are also controlled to ensure the active SIM/eSIM profile in the OOS state has computing resources available to perform radio frequency (RF) scan procedures.

20 Claims, 12 Drawing Sheets

100

Mobile Network Operator 114 ⟷ Provisioning Server 116

Base Station 112-1

Base Station 112-2

Base Station 112-N

• • •

Wireless Device 102

Processor(s) 104

Memory 106 eUICC 108

Baseband Component 110

UICC 118

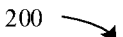
200
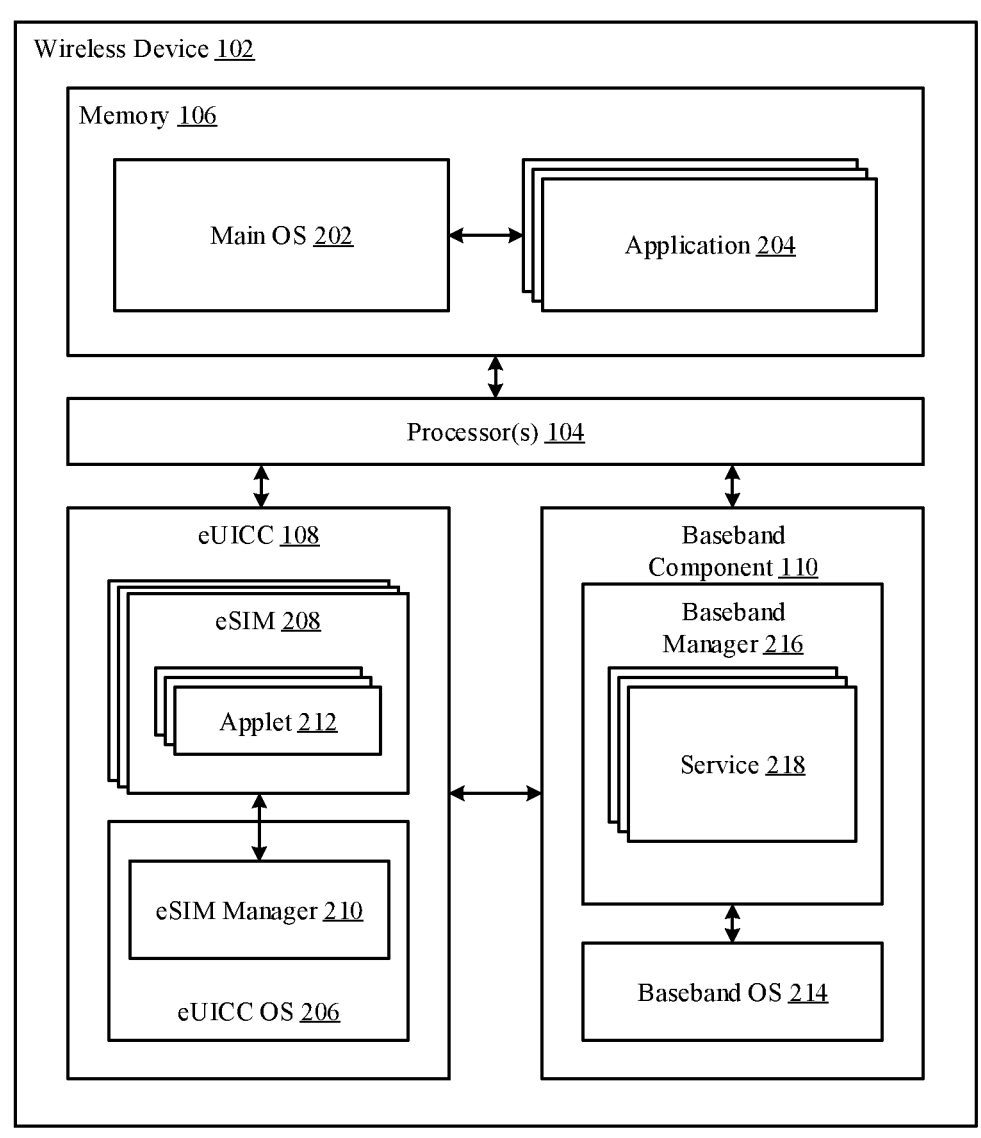
*FIG. 2*

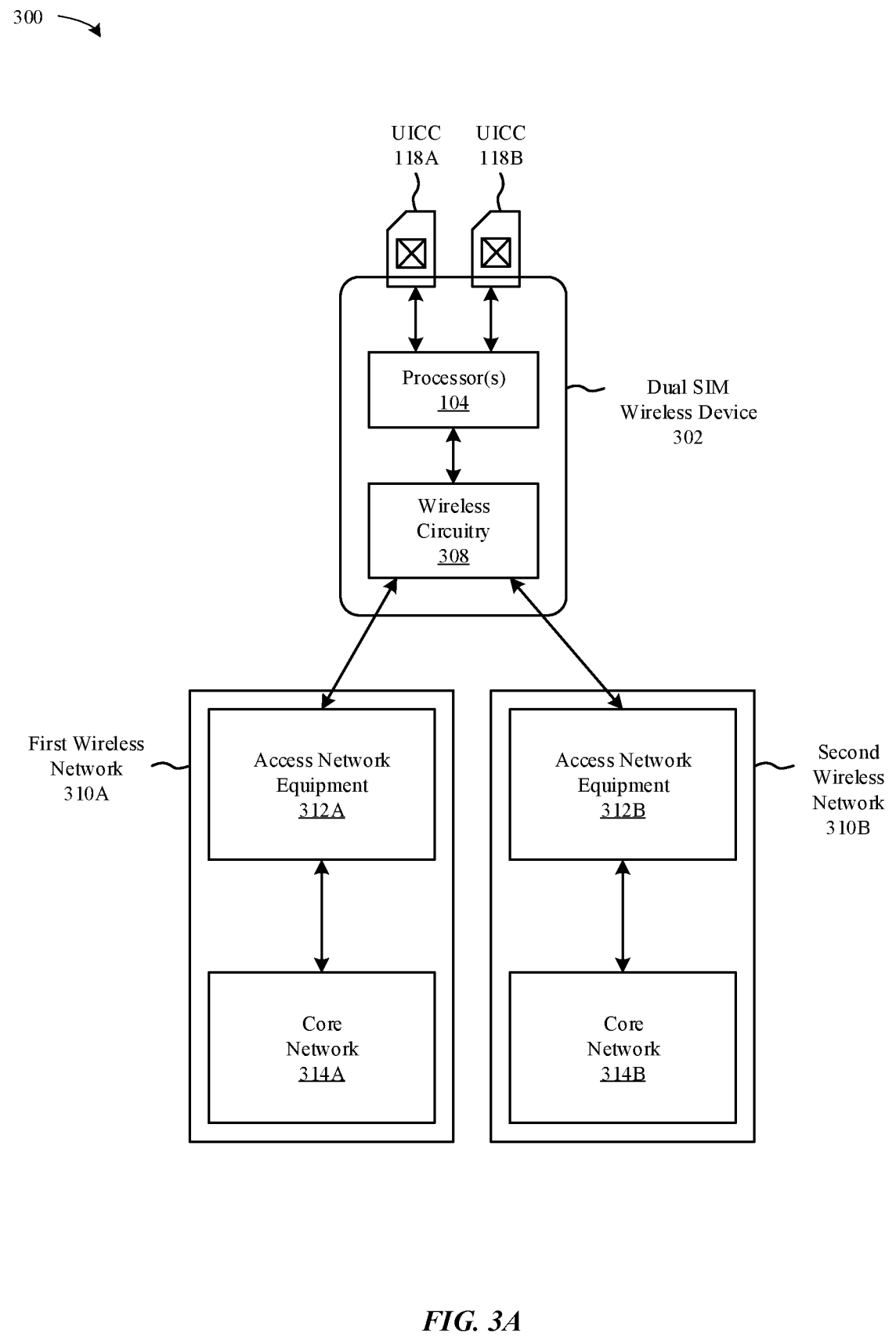

300

UICC
118A

UICC
118B

Dual SIM
Wireless Device
302

Processor(s)
104

Wireless
Circuitry
308

First Wireless
Network
310A

Access Network
Equipment
312A

Core
Network
314A

Second
Wireless
Network
310B

Access Network
Equipment
312B

Core
Network
314B

*FIG. 3A*

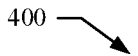
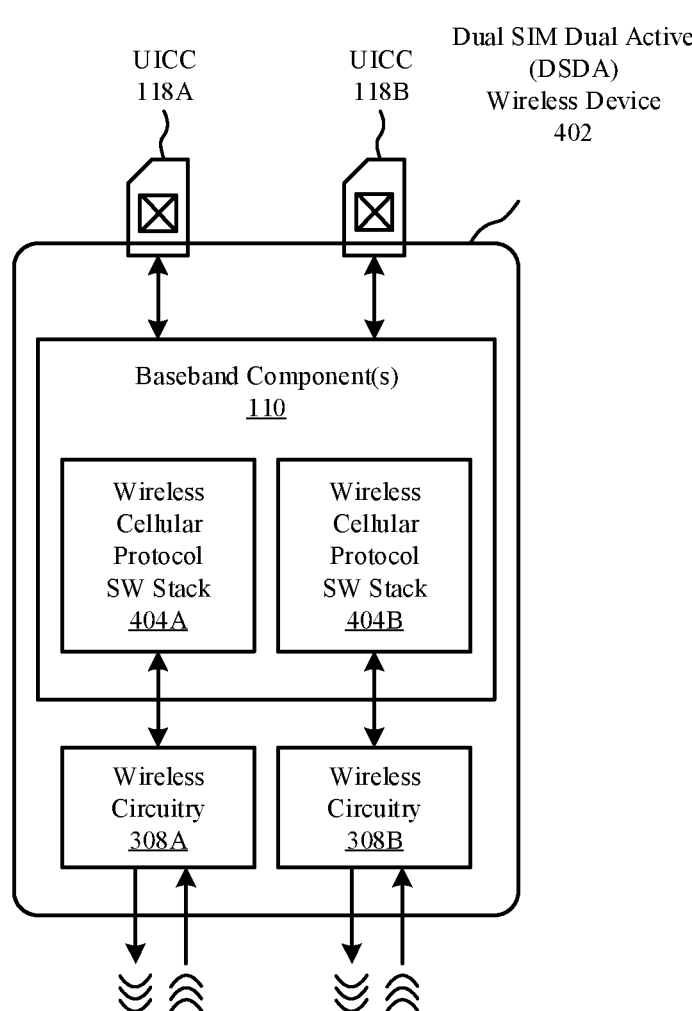
*FIG. 4A*

410 ⟶

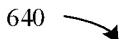
640
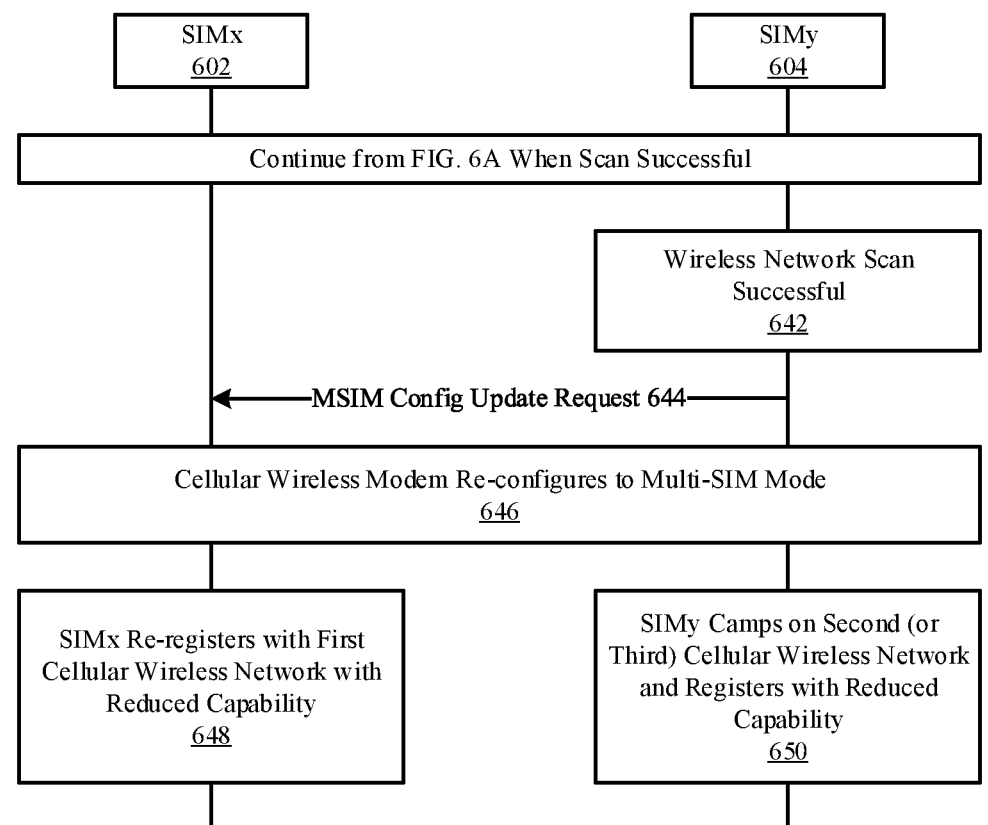
*FIG. 6B*

660

700

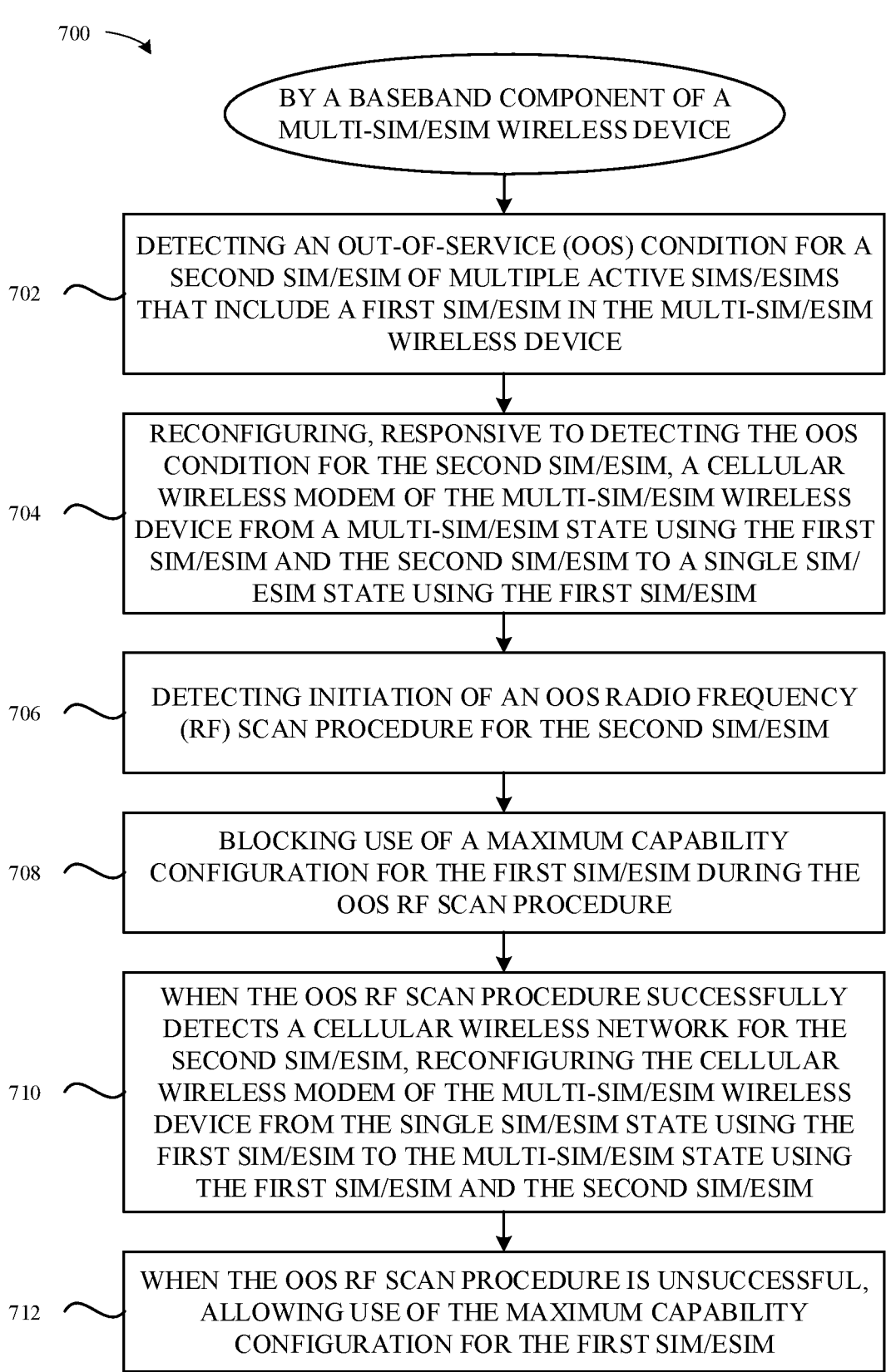

BY A BASEBAND COMPONENT OF A MULTI-SIM/ESIM WIRELESS DEVICE

702    DETECTING AN OUT-OF-SERVICE (OOS) CONDITION FOR A SECOND SIM/ESIM OF MULTIPLE ACTIVE SIMS/ESIMS THAT INCLUDE A FIRST SIM/ESIM IN THE MULTI-SIM/ESIM WIRELESS DEVICE

704    RECONFIGURING, RESPONSIVE TO DETECTING THE OOS CONDITION FOR THE SECOND SIM/ESIM, A CELLULAR WIRELESS MODEM OF THE MULTI-SIM/ESIM WIRELESS DEVICE FROM A MULTI-SIM/ESIM STATE USING THE FIRST SIM/ESIM AND THE SECOND SIM/ESIM TO A SINGLE SIM/ESIM STATE USING THE FIRST SIM/ESIM

706    DETECTING INITIATION OF AN OOS RADIO FREQUENCY (RF) SCAN PROCEDURE FOR THE SECOND SIM/ESIM

708    BLOCKING USE OF A MAXIMUM CAPABILITY CONFIGURATION FOR THE FIRST SIM/ESIM DURING THE OOS RF SCAN PROCEDURE

710    WHEN THE OOS RF SCAN PROCEDURE SUCCESSFULLY DETECTS A CELLULAR WIRELESS NETWORK FOR THE SECOND SIM/ESIM, RECONFIGURING THE CELLULAR WIRELESS MODEM OF THE MULTI-SIM/ESIM WIRELESS DEVICE FROM THE SINGLE SIM/ESIM STATE USING THE FIRST SIM/ESIM TO THE MULTI-SIM/ESIM STATE USING THE FIRST SIM/ESIM AND THE SECOND SIM/ESIM

712    WHEN THE OOS RF SCAN PROCEDURE IS UNSUCCESSFUL, ALLOWING USE OF THE MAXIMUM CAPABILITY CONFIGURATION FOR THE FIRST SIM/ESIM

*FIG. 7*

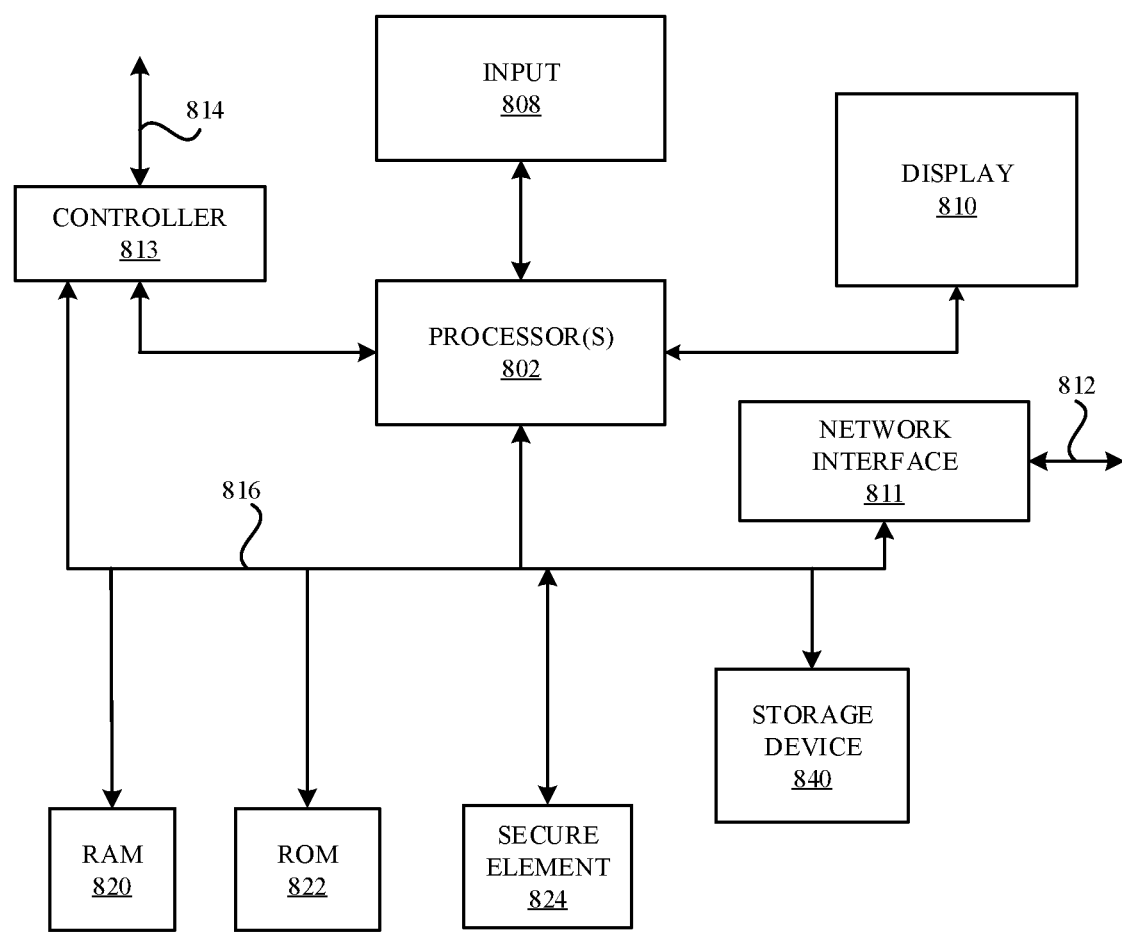
*FIG. 8*

DYNAMIC DEVICE CAPABILITY FOR MULTI-SIM/ESIM WIRELESS DEVICES DURING OUT-OF-SERVICE SCENARIOS

FIELD

The described embodiments relate to wireless communications, including methods and apparatus for dynamically adjusting device capability of a device that includes multiple subscriber identity modules (SIMs) and/or electronic SIMs (eSIMs) during out-of-service scenarios. A multi-SIM/eSIM wireless device can include at least two SIM/eSIM profiles that each provide access to cellular wireless services. When an active SIM/eSIM profile enters an out-of-service (OOS) state or exits an OOS state, the multi-SIM/eSIM wireless device dynamically updates device capabilities to re-allocate device resources to one or more active SIM/eSIM profiles not in the OOS state to improve device performance. Device capabilities for the one or more active SIM/eSIM profiles not in the OOS state are also controlled to ensure the active SIM/eSIM profile in the OOS state has computing resources available to perform radio frequency (RF) scan procedures.

BACKGROUND

Newer generation, fifth generation (5G), cellular wireless networks that implement one or more 3rd Generation Partnership Project (3GPP) standards are rapidly being developed and deployed by mobile network operators (MNOs) worldwide. In addition, sixth generation (6G) standards are in active development. The newer cellular wireless networks provide a range of packet-based services, with 5G (and 6G) technology providing increased data throughput and lower latency connections that promise enhanced mobile broadband services for 5G-capable (and 6G-capable) wireless devices. Access to cellular services provided by an MNO can require use to cellular credentials and/or secure processing provided by a secure element (SE), such as a universal integrated circuit card (UICC) or an embedded UICC (eUICC) included in the wireless device.

Typically, wireless devices have been configured to use removable UICCs, that include at least a microprocessor and a read-only memory (ROM), where the ROM is configured to store an MNO profile, also referred to as subscriber identity module (SIM) or SIM profile, which the wireless device can use to register and interact with an MNO to obtain wireless services via a cellular wireless network. The SIM profile hosts subscriber data, such as a digital identity and one or more cryptographic keys, to allow the wireless device to communicate with a cellular wireless network. Typically, a UICC takes the form of a small removable card, commonly referred to as a SIM card or physical SIM (pSIM) card, which can be inserted into a UICC-receiving bay of a mobile wireless device. In more recent implementations, UICCs are being embedded directly into system boards of wireless devices as eUICCs, which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices. The use of multiple SIMs and/or eSIMs is expected to offer flexibility for access to multiple services of multiple wireless networks.

A multi-SIM/eSIM wireless device can register for access to wireless services of one or more cellular wireless networks using two or more different SIMs/eSIMs in parallel. The real-time processing capability of the multi-SIM/eSIM wireless device can limit configuration of a cellular wireless modem in the multi-SIM/eSIM wireless device depending on the number of active SIMs/eSIMs supported by the cellular wireless modem in the multi-SIM/eSIM wireless device. There exists a need for dynamically managing device capability of a multi-SIM/eSIM wireless device under various circumstances.

SUMMARY

The described embodiments relate to wireless communications, including methods and apparatus for dynamically adjusting device capability of a device that includes multiple subscriber identity modules (SIMs) and/or electronic SIMs (eSIMs) during out-of-service scenarios. A multi-SIM/eSIM wireless device can include at least two SIM/eSIM profiles that each provide access to cellular wireless services. When an active SIM/eSIM profile enters an out-of-service (OOS) state or exits an OOS state, the multi-SIM/eSIM wireless device dynamically updates device capabilities to re-allocate device resources to one or more active SIM/eSIM profiles not in the OOS state to improve device performance. Device capabilities for the one or more active SIMs/eSIM profiles not in the OOS state are also controlled to ensure the active SIM/eSIM profile in the OOS state has computing resources available to perform radio frequency (RF) scan procedures.

A multi-SIM/eSIM wireless device can include multiple SIMs/eSIMs associated with one or more cellular wireless networks. For each active SIM/eSIM, the multi-SIM/eSIM wireless device provides notification of device capabilities for cellular wireless communication to a cellular wireless network associated with the respective SIM/eSIM, e.g., during registration for access to cellular wireless service with the cellular wireless network. When the multi-SIM/eSIM wireless device is configured in a multi-SIM/eSIM state, with multiple active SIMs/eSIMs, the multi-SIM/eSIM wireless device indicates a reduced capability configuration for the multi-SIM/eSIM wireless device in notification messages sent to the cellular wireless networks associated with the active SIMs/eSIMs. When the multi-SIM/eSIM wireless device is configured in a single SIM/eSIM state, with only one active SIM/eSIM in service, the multi-SIM/eSIM wireless device indicates a full capability configuration in a notification message sent to the cellular wireless network associated with the active SIM/eSIM in service. Responsive to detecting an OOS condition for a second SIM/eSIM while configured in the multi-SIM/eSIM state with a first SIM/eSIM active, the multi-SIM/eSIM wireless device re-configures from the multi-SIM/eSIM state to a single SIM/eSIM state and sends a notification to update the device capability configuration with the cellular wireless network associated with the first SIM/eSIM from the reduced capability configuration to the full capability configuration. While in the single SIM/eSIM state, a baseband component of the multi-SIM/eSIM wireless device blocks use of a maximum capability configuration for the first SIM/eSIM during any radio frequency (RF) scans performed for an OOS recovery scan procedure to search for cellular wireless networks for the second SIM/eSIM that is in the OOS state. A cellular wireless software stack for the second SIM/eSIM that is in the OOS state provides a message to a cellular wireless software stack for the first SIM/eSIM to request suspension of use of the maximum capability configuration and waits for a message from the cellular wireless software stack for the first SIM/eSIM to confirm suspension of the maximum capability configuration before performing an RF scan. Disallowing use of the maximum capability configuration by the first SIM/eSIM frees resources for the RF scan for the second SIM/eSIM. If the first SIM/eSIM is configured with a maximum capability configuration when the message requesting suspension of use of the maximum capability configuration is received, the cellular wireless software stack for the first SIM/eSIM waits until the maximum capability configuration is no longer used before sending to the cellular wireless software stack of the second SIM/eSIM confirmation of suspension of the maximum capability configuration. When the RF scan successfully locates a cellular wireless network for the second SIM/eSIM, the multi-SIM/eSIM wireless device reconfigures from the single SIM/eSIM state to the multi-SIM/eSIM state and sends notifications to respective cellular wireless networks indicating a reduced capability configuration for the multi-SIM/eSIM wireless device. When the RF scan fails to locate a cellular wireless network for the second SIM/eSIM, the multi-SIM/eSIM wireless device remains in the single SIM/eSIM state with a full capability configuration for the first SIM/eSIM.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 2 illustrates a block diagram of a more detailed view of exemplary components of a mobile wireless device of the system of FIG. 1, according to some embodiments.

FIG. 3A illustrates a block diagram of an exemplary dual SIM wireless device in communication with two different wireless networks, according to some embodiments.

FIG. 4A illustrates a block diagram of an exemplary dual SIM dual active (DSDA) wireless device, according to some embodiments.

FIGS. 6A, 6B, and 6C illustrate flow charts of an exemplary dynamic device capability procedure by a multi-SIM wireless device, according to some embodiments.

FIG. 7 illustrates a flow chart of an exemplary method for dynamic device capability performed by a multi-SIM/eSIM wireless device, according to some embodiments.

FIG. 8 illustrates a block diagram of exemplary elements of a wireless device, according to some embodiments.

DETAILED DESCRIPTION

Figure 1:
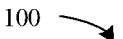
FIG. 1 illustrates a block diagram of different components of an exemplary system configured to implement cellular service access and provisioning for a wireless device, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

The described embodiments relate to wireless communications, including methods and apparatus for dynamically adjusting device capability of a multi-SIM/eSIM wireless device that includes multiple subscriber identity modules (SIMs) and/or electronic SIMs (eSIMs) device during out-of-service scenarios. A multi-SIM/eSIM wireless device can include at least two SIM/eSIM profiles that each provide access to cellular wireless services. When an active SIM/eSIM profile enters an out-of-service (OOS) state or exits an OOS state, the multi-SIM/eSIM wireless device dynamically updates device capabilities to re-allocate device resources to one or more active SIM/eSIM profiles not in the OOS state to improve device performance. Device capabilities for the one or more active SIM/eSIM profiles not in the OOS state are also controlled to ensure the active SIM/eSIM profile in the OOS state has computing resources available to perform radio frequency (RF) scan procedures.

A multi-SIM/eSIM wireless device can include multiple SIMs/eSIMs associated with one or more cellular wireless networks. For each active SIM/eSIM, the multi-SIM/eSIM wireless device provides notification of device capabilities for cellular wireless communication to a cellular wireless network associated with the respective SIM/eSIM, e.g., during registration for access to cellular wireless service with the cellular wireless network. When the multi-SIM/eSIM wireless device is configured in a multi-SIM/eSIM state, with multiple active SIMs/eSIMs, the multi-SIM/eSIM wireless device indicates a reduced capability configuration for the multi-SIM/eSIM wireless device in notification messages sent to the cellular wireless networks associated with the active SIMs/eSIMs. When the multi-SIM/eSIM wireless device is configured in a single SIM/eSIM state, with only one active SIM/eSIM in service, the multi-SIM/eSIM wireless device indicates a full capability configuration in a notification message sent to the cellular wireless network associated with the active SIM/eSIM in service. In a representative example, the multi-SIM/eSIM wireless device includes a first SIM/eSIM associated with a first cellular wireless network and a second SIM/eSIM associated with a second cellular wireless network. When both the first SIM/eSIM and the second/eSIM are active, e.g., enabled for use by the multi-SIM/eSIM wireless device, the multi-SIM/eSIM wireless device can be configured to use a reduced capability configuration for the first SIM/eSIM and for the second SIM/eSIM. In some embodiments, the multi-SIM/eSIM wireless device can be limited in hardware capabilities, e.g., real-time computing resources, to be unable to support a full capability (or a maximum capability configuration) for both the first SIM/eSIM and the second SIM/eSIM simultaneously. The reduced capability configuration allows each SIM/eSIM to share a limited set of device resources. When an active Sim/eSIM, e.g., the second SIM/eSIM, loses connectivity, such as when entering an OOS state, at least some resources previously used by the second SIM/eSIM can be used instead by the remaining active first SIM/eSIM. Responsive to detecting an OOS condition for the second SIM/eSIM, while configured in the multi-SIM/eSIM state with a first SIM/eSIM active, the multi-SIM/eSIM wireless device re-configures from the multi-SIM/eSIM state to a single SIM/eSIM state and sends a notification to update the device capability configuration with the cellular wireless network associated with the first SIM/eSIM from the reduced capability configuration to the full capability configuration.

To recover from the OOS state, the multi-SIM/eSIM wireless device scans for cellular wireless networks available and suitable for use by the second SIM/eSIM. As performing radio frequency (RF) scans to locate cellular wireless networks as part of an OOS recovery procedure can require substantial processing resources, a baseband component of the multi-SIM/eSIM wireless device, while in the single SIM/eSIM state, blocks use of a maximum capability configuration for the first SIM/eSIM during any RF scans performed as part of the OOS recovery procedure for the second SIM/eSIM. Each active SIM/eSIM of the multi-SIM/eSIM wireless device can be associated with a respective cellular wireless software stack that implements cellular baseband processing for the respective SIM/eSIM. An RF scan of the OOS recovery procedure can be initiated responsive to expiration of an OOS recovery timer for the second SIM/eSIM. A cellular wireless software stack for the second SIM/eSIM that is in the OOS state can provide a message to a cellular wireless software stack for the first SIM/eSIM to request suspension of use of the maximum capability configuration by the first SIM/eSIM during a forthcoming RF scan. The cellular wireless software stack for the first SIM/eSIM can wait for a message from the cellular wireless software stack for the first SIM/eSIM to confirm suspension of the maximum capability configuration before performing the RF scan. Disallowing use of the maximum capability configuration by the first SIM/eSIM frees resources for the RF scan for the second SIM/eSIM.

If the first SIM/eSIM is configured with a maximum capability configuration when the message requesting suspension of use of the maximum capability configuration is received from the cellular wireless stack for the second SIM/eSIM, the cellular wireless software stack for the first SIM/eSIM waits until the maximum capability configuration is no longer used before sending to the cellular wireless software stack of the second SIM/eSIM confirmation of suspension of the maximum capability configuration. If the first SIM/eSIM is in an idle mode (and therefore not configured with the maximum capability configuration) or in a connected mode with a capability configuration other than the maximum capability configuration when the message requesting suspension is received, the cellular wireless software stack for the first SIM/eSIM can respond immediately to the cellular wireless software stack for the second SIM/eSIM with the confirmation message. When the RF scan successfully locates a cellular wireless network for the second SIM/eSIM, the multi-SIM/eSIM wireless device reconfigures from the single SIM/eSIM state to the multi-SIM/eSIM state and sends notifications to respective cellular wireless networks indicating a reduced capability configuration for the multi-SIM/eSIM wireless device. When the RF scan fails to locate a cellular wireless network for the second SIM/eSIM, the multi-SIM/eSIM wireless device remains in the single SIM/eSIM state with a full capability configuration for the first SIM/eSIM. Notably, the multi-SIM/eSIM wireless device does not indicate a reduced capability configuration for the first SIM/eSIM to the cellular wireless network associated with the first SIM/eSIM while the second SIM/eSIM is in the OOS state performing the OOS recovery procedure. Internally, however, the baseband component of the multi-SIM/eSIM wireless device ensures computing resources are available for the RF scans of the OOS recovery procedure by blocking use of the maximum capability configuration during the RF scans.

In some embodiments, the reduced capability configuration includes using fewer component carriers for each active SIM/eSIM than supported by the multi-SIM/eSIM wireless device when using a single active SIM/eSIM. The multi-SIM/eSIM wireless device can restrict the number of component carriers for each active SIM/eSIM by reporting device capabilities with support for a limited number of component carriers to the cellular wireless networks associated with the active SIMs/eSIMs. In some embodiments, the reduced capability configuration includes using fewer multiple-input multiple-output (MIMO) layers for each component carrier of each active SIM/eSIM than supported by the multi-SIM/eSIM wireless device when using a single active SIM/eSIM. The multi-SIM/eSIM wireless device can restrict the number of MIMO layers for each component carrier of each active SIM/eSIM by reporting device capabilities with support for a limited number of MIMO layers for a component carrier to the cellular wireless networks associated with the active SIMs/eSIMs. In some embodiments, the maximum capability configuration for a SIM/eSIM includes using a maximum number of component carriers and/or a maximum number of MIMO layers for each component carrier as indicated in a full capability configuration reported to a cellular wireless network associated with the SIM/eSIM. Blocking use of the maximum capability configuration for the SIM/eSIM can include restricting the baseband component of the multi-SIM/eSIM wireless device from using the maximum number of component carriers and/or the maximum number of MIMO layers for each component carrier for the SIM/eSIM.

These and other embodiments are discussed below with reference to FIGS. 1 through 8; however, those skilled in the art will readily appreciate that the detailed description given herein with respect to these figures is for explanatory purposes only and should not be construed as limiting.

FIG. 1 illustrates a block diagram of different components of a system 100 that includes i) a wireless device 102, which can also be referred to as a mobile wireless device, a cellular wireless device, a wireless communication device, a mobile device, a user equipment (UE), a device, a primary wireless device, a secondary wireless device, an accessory wireless device, a cellular-capable wearable device, and the like, ii) a group of base stations 112-1 to 112-N, which are managed by different Mobile Network Operators (MNOs) 114, and iii) a set of provisioning servers 116 that are in communication with the MNOs 114. The wireless device 102 can represent a mobile computing device (e.g., an iPhone®, an iPad®, or an Apple Watch® by Apple®), the base stations 112-1 to 112-N can represent cellular wireless network entities including fourth generation (4G) Long Term Evolution (LTE) evolved NodeBs (eNodeBs or eNBs), fifth generation (5G) NodeBs (gNodeBs or gNBs), and/or sixth generation (6G) NodeBs that are configured to communicate with the wireless device 102, and the MNOs 114 can represent different wireless service providers that provide specific services (e.g., voice, data, video, messaging) to which a user of the wireless device 102 can subscribe to access the services via the wireless device 102. Applications resident on the wireless device 102 can advantageously access services using 4G LTE connections, 5G connections, and/or 6G connections (when available) via the base stations 112. The wireless device 102 can include processing circuitry, which can include one or more processors 104 and a memory 106, an embedded Universal Integrated Circuit Card (eUICC) 108, and a baseband component 110. In some embodiments, the wireless device 102 can include one or more universal integrated circuit cards (UICCs) 118, also referred to as physical SIM cards, each UICC 118 including a SIM, in addition to or in place of the eUICC 108 providing one or more electronic SIMs (eSIMs). A wireless device 102 that includes multiple active (enabled) SIMs and/or eSIMs can be referred to generally herein as a multi-SIM/eSIM wireless device. The one or more processors 104 can include one or more wireless processors, such as a cellular baseband component, a wireless local area network processor, a wireless personal area network processor, a near-field communication processor, and one or more system-level application processors. The components of the wireless device 102 work together to enable the wireless device 102 to provide useful features to a user of the wireless device 102, such as cellular wireless network access, non-cellular wireless network access, localized computing, location-based services, and Internet connectivity. The eUICC 108 can be configured to store multiple eSIMs for accessing services offered by one or more different MNOs 114 via communication through base stations 112-1 to 112-N. To be able to access services provided by the MNOs, one or more eSIMs can be provisioned to the eUICC 108 of the wireless device 102. The wireless device 102 can include wireless circuitry, including the baseband component 110 and at least one transmitter/receiver, also referred to as a transceiver. In some embodiments, the wireless device 102 includes two or more transceivers. In some embodiments, the wireless device 102 can be configured to operate in a dual SIM, dual standby (DSDS) mode, with two SIMs, one SIM and one eSIM, or two eSIMs enabled and active simultaneously, but allowing connections to only one cellular wireless network via a single, active transceiver at a time. In some embodiments, the transceiver of the wireless device 102 includes multiple receivers to allow reception of signals from multiple wireless networks and only one transmitter for transmitting signals to one of the multiple wireless networks at a time. In some embodiments, the wireless device 102 can be configured to operate in a dual SIM dual active (DSDA) mode, with two SIMs, one SIM and one eSIM, or two eSIMs enabled and active, and allowing cellular connections to two cellular wireless networks via two active transceivers simultaneously, where each transceiver includes at least one transmitter and at least one receiver.

FIG. 2 illustrates a block diagram 200 of a more detailed view of exemplary components of a wireless device 102 of the system 100 of FIG. 1. The one or more processors 104, in conjunction with the memory 106, can implement a main operating system (OS) 202 that is configured to execute applications 204 (e.g., native OS applications and user applications). The one or more processors 104 can include applications processing circuitry and, in some embodiments, wireless communications control circuitry. The applications processing circuitry can monitor application requirements and usage to determine recommendations about communication connection properties, such as bandwidth and/or latency, and provide information to the communications control circuitry to determine suitable wireless connections for use by particular applications. The communications control circuitry can process information from the applications processing circuitry as well as from additional circuitry, such as the baseband component 110, and other sensors (not shown) to determine states of components of the wireless device 102, e.g., reduced power modes, as well as of the wireless device 102 as a whole, e.g., mobility states, activity/inactivity states. The wireless device 102 further includes an eUICC 108 that can be configured to implement an eUICC OS 206 to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, updating, or otherwise performing management of the eSIMs 208 within the eUICC 108 and providing the baseband component 110 with access to the eSIMs 208 to provide access to wireless services for the wireless device 102. The eUICC OS 206 can include an eSIM manager 210, which can perform management functions for various eSIMs 208. Each eSIM 208 can include a number of applets 212 that define the manner in which the eSIM 208 operates. For example, one or more of the applets 212, when implemented by the baseband component 110 and the eUICC 108, can be configured to enable the wireless device 102 to communicate with an MNO 114 and provide useful features (e.g., phone calls and internet) to a user of the wireless device 102.

A baseband component 110 of the wireless device 102 can include a baseband OS 214 that is configured to manage hardware resources of the baseband component 110 (e.g., a processor, a memory, different radio components, etc.). The baseband component 110 can also be referred to as a wireless baseband component, a baseband wireless processor, a cellular baseband component, a cellular component, and the like. According to some embodiments, the baseband component 110 can implement a baseband manager 216 that is configured to interface with the eUICC 108 to establish a secure channel with a provisioning server 116 and obtain information (such as eSIM data) from the provisioning server 116 for purposes of managing eSIMs 208. The baseband manager 216 can be configured to implement services 218, which represent a collection of software modules that are instantiated by way of the various applets 212 of enabled eSIMs 208 that are included in the eUICC 108. For example, services 218 can be configured to manage different connections between the wireless device 102 and MNOs 114 according to the different eSIMs 208 that are enabled within the eUICC 108.

FIG. 3A illustrates a block diagram 300 of components of an exemplary dual SIM wireless device 302 including one or more processor(s) 104 and wireless circuitry 308 that provides for wireless radio frequency (RF) connections between the dual SIM wireless device 302 and a first wireless network 310A and a second wireless network 310B. In some embodiments, the wireless circuitry 308 includes one or more baseband component(s) 110, and a set of RF analog front-end circuitry. In some embodiments, the wireless circuitry 308 and/or a portion thereof can include or be referred to as a wireless transmitter/receiver or a transceiver or a radio. The terms circuit, circuitry, component, and component block may be used interchangeably herein, in some embodiments, to refer to one or more operational units of a wireless device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 308 can include components of RF analog front-end circuitry, e.g., a set of one or more antennas, which can be interconnected with additional supporting RF circuitry that can include filters and other analog components that can be "configured" for transmission and/or reception of analog signals via one or more corresponding antennas to one or more of the first and second wireless networks 310A/B. The processor(s) 104 and the wireless circuitry 308 can be configured to perform and/or control performance of one or more functionalities of the dual SIM wireless device 302, in accordance with various implementations. The processor(s) 104 and the wireless circuitry 308 can provide functionality for coordinating hardware/software resources in the dual SIM wireless device 302 to improve performance for mobility management of connections to one or more of the wireless networks 310A/B. Limited resources can be shared among multiple active SIMs, and device capabilities indicating configuration options can be reported to cellular wireless networks for each active SIM, e.g., at a time of registration of an active SIM with its respective cellular wireless network. A wireless device 102 can support more computing intensive configurations with fewer active SIMs and require less computing intensive configurations with more active SIMs. Computing resources required for an active SIM can also depend on the active SIM's current state, e.g., an active SIM in an out-of-service (OOS) state can require less computing resources than an active SIM that is not in an OOS state. Computing resources for the active SIM in the OOS state can also depend on whether specific operations are being performed for the active SIM that is in the OOS state, such as radio frequency (RF) scans for cellular wireless networks with which the SIM can return to an in-service state. A baseband component 110 of the dual SIM wireless device 302 can adjust device capabilities, e.g., limit certain configurations for active SIMs that are in service when computing resources are required for the active SIM in the OOS state to perform certain operations (e.g., the RF scans).

The dual SIM wireless device 302 includes two removable UICCs 118A/B, which can be inserted and removed from the dual SIM wireless device 302 together or independently. Each UICC 118A/B includes at least one software identity module (SIM), which can be embodied as a software/firmware program installed on the UICC 118A/B. Removable UICCs 118A/B can provide a user of the dual SIM wireless device 302 the ability to replace a UICC to change services, provided the dual SIM wireless device 302 supports such flexibility (e.g., an "unlocked" device that is not "locked" to a particular wireless network operator or service provider). Hardware complexity and/or a size of a wireless device can limit the ability to include multiple UICC slots, and thus additional arrangements for wireless devices are can include multiple SIMs on a single UICC 118 and/or eSIMs 208 on an eUICC 108 or combinations thereof. The dual SIM wireless device 302, in some embodiments, can register with two different wireless networks, e.g., the first and second wireless networks 310A/B, simultaneously. The first wireless network 310A can operate in accordance with a first wireless communication protocol, e.g., a 5G NR wireless communication protocol, while the second wireless network 310B can operate with a second wireless communication protocol that can be the same as the first wireless communication protocol or a different wireless communication protocol, e.g., a 4G LTE wireless communication protocol. The first and second wireless networks 310A/B can operate using different radio frequency bands in accordance with their respective wireless communication protocols. The first and second wireless network 310A/B can operate using different radio frequency bands of a common wireless communication protocol, e.g., using an FR1 RF band and an FR2 band of a 5G NR wireless communication protocol. The wireless circuitry 308 of the dual SIM wireless device 302 can be configured to register with and/or establish a connection with the first wireless network 310A via access network equipment 312A, which interfaces with a core network 314A. The wireless circuitry 308 of the dual SIM wireless device 302 can also be configured to register with and/or establish a connection with the second wireless network 310B via access network equipment 312B, which interfaces with a core network 314B. The dual SIM wireless device 302 can indicate device capabilities for configuration of the dual SIM wireless device 302, e.g., a number of component carriers supported and/or a number of multi-input, multiple-output (MIMO) layers supported for a given component carrier, when registering with the respective wireless networks 310A/B. In some embodiments, the wireless circuitry 308 of the dual SIM wireless device 302 supports simultaneous transmission and reception to both the first and second wireless networks 310A/B. In some embodiments, the wireless circuitry 308 of the dual SIM wireless device 302 supports transmission and reception to only one of the first and second wireless networks 310A/B at a time. In some embodiments, the wireless circuitry 308 of the dual SIM wireless device 302 supports transmission to only one of the first and second wireless networks 510A/B at a time and reception from one or both of the first and second wireless networks 310A/B. A dual SIM wireless device 302 that can connect to only one wireless network at a time but can monitor and/or receive communication from two wireless networks with which it is registered can be referred to as a "Dual SIM, Dual Standby" (DSDS) wireless device. A dual SIM wireless device 302 that can connect to two wireless networks simultaneously using two different subscriber identities can be referred to as a "Dual SIM, Dual Active" (DSDA) wireless device. In general, the dual SIM wireless device 302 can be referred to as a "DSDx" wireless device, where "x" can indicate either "S" for "standby" or "A" or "active".

Figure 3B:
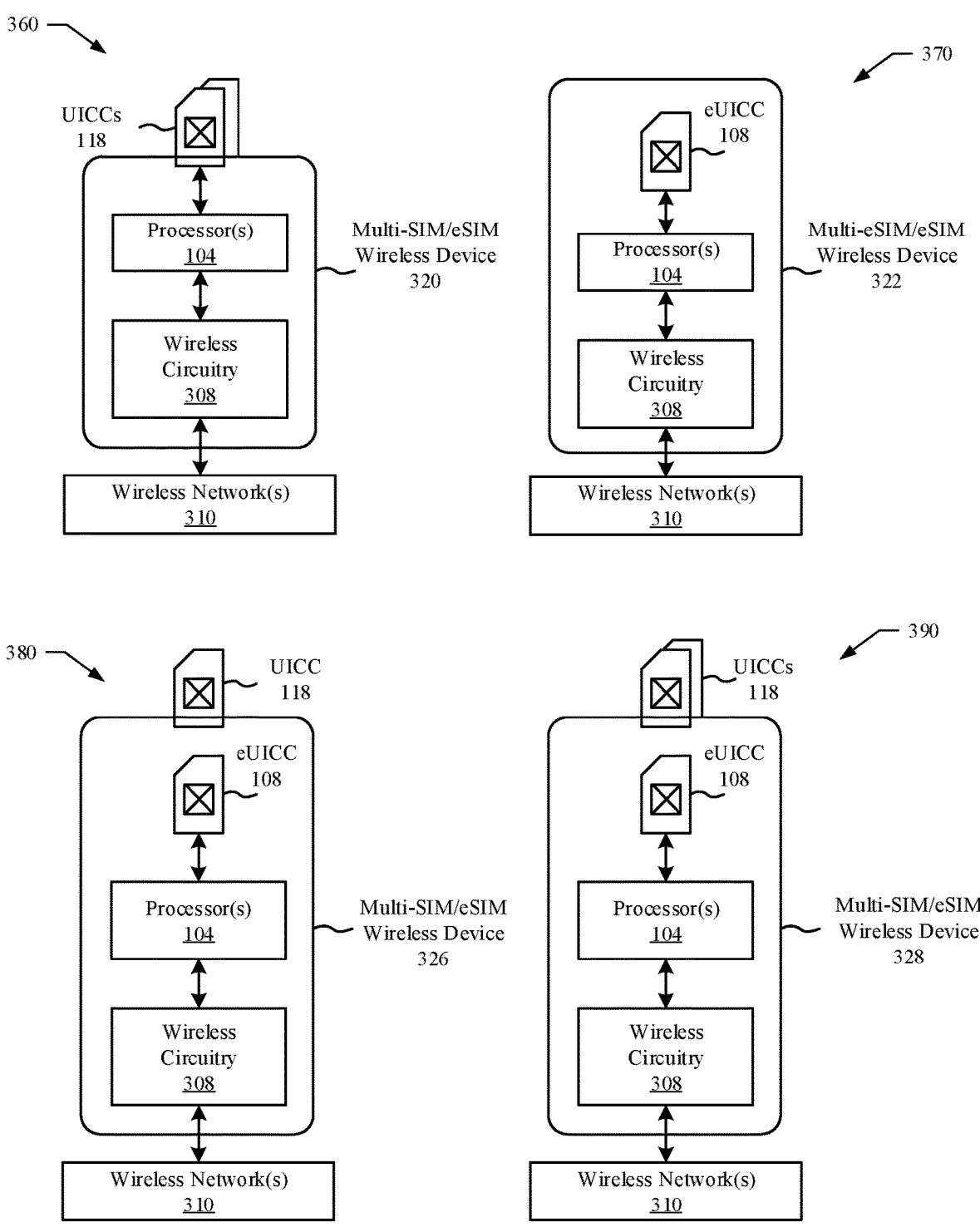
FIG. 3B illustrates block diagrams of exemplary multi-SIM and multi-SIM/eSIM wireless devices, according to some embodiments.

FIG. 3B illustrates diagrams 360, 370, 380, 390 of additional exemplary multi-SIM/eSIM wireless devices 320, 322, 326, 328 that support multiple subscriber identities using removable UICCs 118 and/or eUICCs 108 with SIMs or eSIMs 208 implemented respectively thereon. As illustrated in diagram 360, a multi-SIM/eSIM wireless device 320 includes multiple UICCs 118, which can be inserted and removed individually or together, and communicate with one or more processors 104 that connect to wireless circuitry 308 that provides for wireless communication with one or more wireless networks 310. As the physical size and design of the multi-SIM/eSIM wireless device 320 can limit the number of UICCs 118 that can be supported, alternatively as shown by diagram 370, a multi-SIM/eSIM wireless device 322 can include an eUICC 108 connected with the processor(s) 104 and to the wireless network(s) 310 via the wireless circuitry 308. The eUICC 108 can be built into the multi-SIM/eSIM wireless device 322 and can be not removable from the multi-SIM/eSIM wireless device 322, e.g., permanently affixed to a circuit board in the multi-SIM/eSIM wireless device 322. The eUICC 108 can be programmed such that one or more eSIMs 208 can be implemented on the eUICC 108. Each eSIM 208 can be associated with a distinct subscriber identity and/or provide distinct services or subscriptions for a user of the multi-SIM/eSIM wireless device 322. Diagram 380 illustrates a multi-eSIM/SIM wireless device 326 that includes a removable UICC 118, on which can be installed one or more SIMs, and an eUICC 108 on which one or more eSIMs 208 can be installed. The combination of SIMs on the UICC 118 and/or eSIMs 208 on the eUICC 108 can provide for connections to one or more wireless networks 310 using the wireless circuitry 308 under the control of the processor(s) 104 of the multi-SIM/eSIM wireless device 326. Diagram 390 illustrates another multi-eSIM/SIM wireless device 328 that includes multiple UICCs 118, on which one or more SIMs can be installed, and an eUICC 108, on which one or more eSIMs 208 can be installed. A combination of one or more SIMs on a UICC 118 and/or eSIMs on an eUICC 108 can provide for connections to one or more wireless networks 310 using the wireless circuitry 308 under the control of the processor(s) 104 of the multi-SIM/eSIM wireless device 328. In general, a wireless device 102 that supports multiple subscriber identities can include (i) at an eUICC 108 and/or (ii) one or more UICCs 118. Each UICC 118 can support one or more SIMs, and each eUICC 108 can support one or more eSIMs 208. A wireless device 102 that supports multiple subscriber identities, e.g., 302, 320, 322, 326, 328, can include a combination of SIMs and/or eSIMs 208 to support communication with one or more wireless networks 310.

FIG. 4A illustrates a diagram 400 of a DSDA wireless device 402 that includes two removable UICCs 118A/B, on which at least two SIMs are installed, e.g., one SIM on each of the UICCs 118A/B. (While the DSDA wireless device 402 illustrated in FIG. 4A includes two UICCs 118A/B, alternative architectures for the DSDA wireless device 402 can include combinations of UICCs 118 and/or an eUICC 108 as discussed herein.) Each UICC 118A/B can communicate with one or more baseband components 110, e.g., via another processor 104 and/or directly. A first cellular wireless protocol software (SW) stack 404A on the one or more baseband component(s) 110 can communicate with a first wireless network 310A (not shown) via wireless circuitry 308A, while a second cellular wireless protocol SW stack 404B can communicate with a second wireless network 310B (not shown) via wireless circuitry 308B. With parallel wireless circuitry 308A/B, the DSDA wireless device 402 can interact with two wireless networks 310A/B independently without requiring an interface or interaction between the cellular wireless protocol SW stacks 304A/B. Each of the cellular wireless protocol SW stacks 404A/B can support communication using one or more wireless communication protocols. With sufficient parallel wireless circuitry 308A/B and parallel cellular wireless protocol SW stacks 404A/B, the DSDA wireless device 402 can be registered with two different wireless networks 310A/B and can form connections with the two different wireless networks 310A/B in parallel and independently. The DSDA wireless device 402 can receive notifications (e.g., paging messages and/or paging indications) from a second wireless network 310B while connected to a first wireless network 310A, as the parallel wireless circuitry 308A/B permits parallel, simultaneous communication to two different wireless networks 310A/B.

In some cases, computing resources and/or hardware limitations may be managed for the cellular wireless protocol SW stacks 404A/B jointly, e.g., when a maximum capability configuration for each of the cellular wireless modems associated with active SIMs cannot be fully supported. In some cases the cellular wireless protocol SW stacks 404A/B communicate with each other to indicate various states, e.g., in-service and out-of-service states, to request limits on configuration of the cellular wireless modems, to confirm limits on configuration of the cellular wireless modems, or to remove limits on configuration of the cellular wireless modems.

Figure 4B:
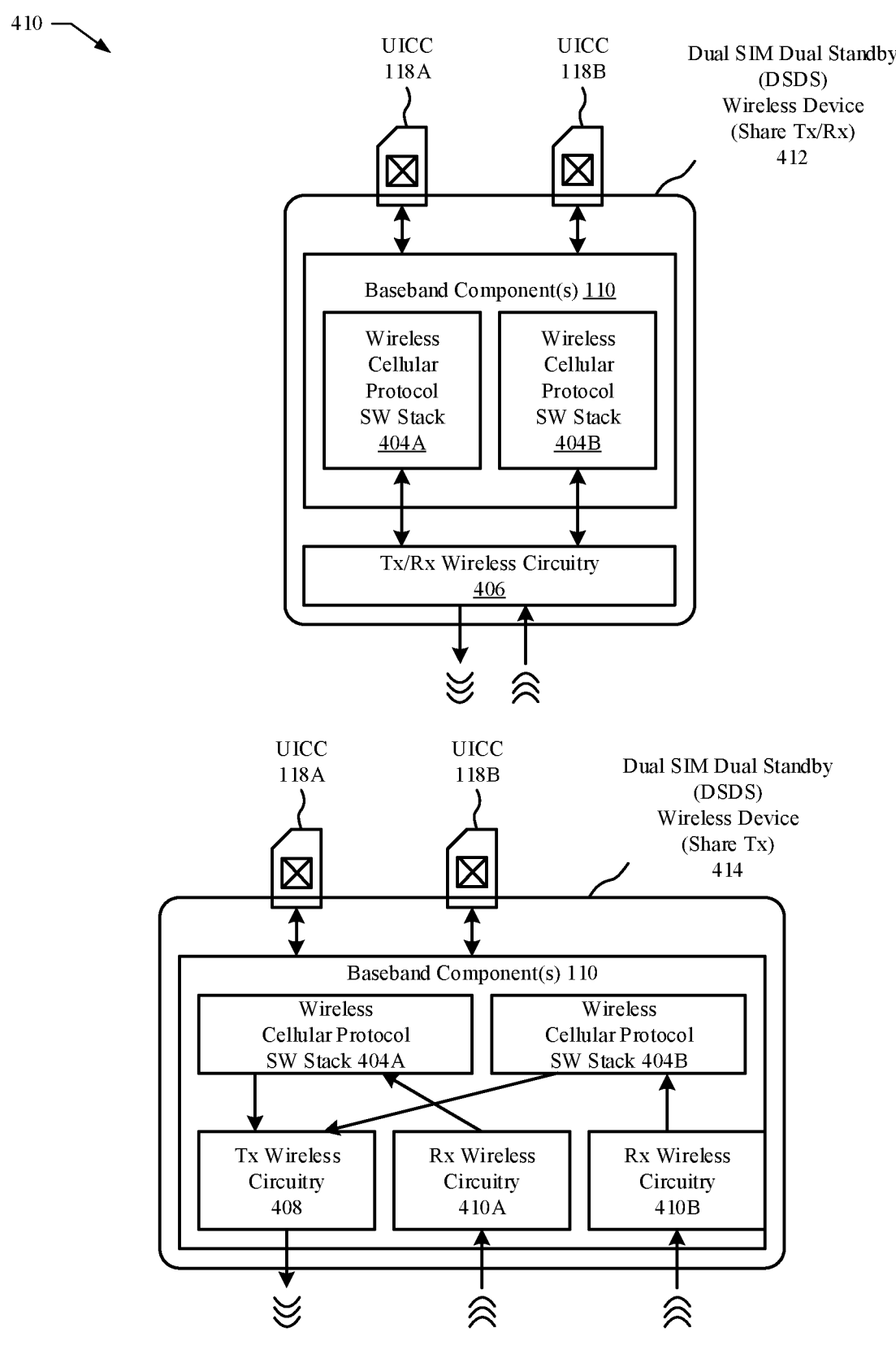
FIG. 4B illustrates block diagrams of exemplary dual SIM dual standby (DSDS) wireless devices, according to some embodiments.

FIG. 4B illustrates a diagram 410 of two exemplary configurations of DSDS wireless devices 412/414. (While the DSDS wireless devices 412/414 illustrated in FIG. 4B include two UICCs 118A/B, alternative architectures for the DSDS wireless devices 412/414 can include combinations of UICCs 118 and/or an eUICC 108 as discussed herein.) A DSDS wireless device 412 includes two removable UICCs 118A/B, on which at least two SIMs are installed, and each UICC 118A/B can communicate with one or more baseband components 110, on which two cellular wireless protocol software stacks 404A/B operate. Each cellular wireless protocol software stack 404A/B can communicate with a respective wireless network 310A/B (not shown) via a set of common transmit/receive (Tx/Rx) wireless circuitry 406. In some embodiments, the set of common Tx/Rx wireless circuitry 406 provides for transmission and/or reception by one cellular wireless protocol SW stack 404A or 404B at a time, and thus the DSDS wireless device 412 can be associated with two (or more) wireless networks 310A/B at the same time but not be able to communicate with both wireless networks 310A/B simultaneously. For example, the DSDS wireless device 412 can be configured to operate in a time division mode that shares the Tx/Rx wireless circuitry 406 among the cellular wireless protocol SW stacks 404A/B. In some embodiments, the cellular wireless protocol SW stacks 404A/B can both operate in an idle mode and listen for paging messages from each of two different wireless networks 310A/B (e.g., alternate listening for paging messages from each wireless network 310A/B by reconfiguring if required the Tx/Rx wireless circuitry 406 to receive signals from each wireless network 310A/B.) The DSDS wireless device 412 can permit connections with two different wireless networks 310A/B using two different subscriber identities but only one connection at any time.

In a second configuration of a DSDS wireless device 414, a shared set of wireless circuitry 408/410A/B provides for one transmit path and two parallel receive paths that can be used simultaneously. Each cellular wireless protocol software stack 404A/B can be configured to transmit via a set of transmit (Tx) wireless circuitry 408, but only one cellular wireless protocol software stack 404A/B can communicate at any one time via the Tx wireless circuitry 408. Both cellular wireless protocol software stacks 404A/B can receive radio frequency wireless signals via respective receive (Rx) wireless circuitry 410A/B in parallel. The DSDS wireless device 414 can share transmit wireless circuitry 408 between two cellular wireless protocol SW stacks 404A/B, while permitting simultaneous reception via dedicated (and/or configurable) receive wireless circuitry 410A/B. The DSDS wireless device 414 can provide for a connection (e.g., bi-directional data and/or signaling communication) with only one wireless network at a time; however, paging messages (or other control signaling) can be received (e.g., in a downlink direction) from two wireless networks 310A/B at the same time. Similarly, the parallel Rx wireless circuitry 410A/B can provide for reception of broadcast channels, signaling channels, synchronization channels, or other signals from two parallel wireless networks, e.g., for measurements of cells, as part of reselection and/or handover processes, when searching for wireless networks with which to establish connections, to perform downlink (DL) synchronization processes, and/or for associating or registering with wireless networks, etc. The DSDS wireless device 414 can be connected to a first wireless network 310A, e.g., in a voice call, data connection, video call, or other bi-directional connection with the first wireless network 310A, and can receive paging messages from a second wireless network 310B at the same time.

Figure 5:
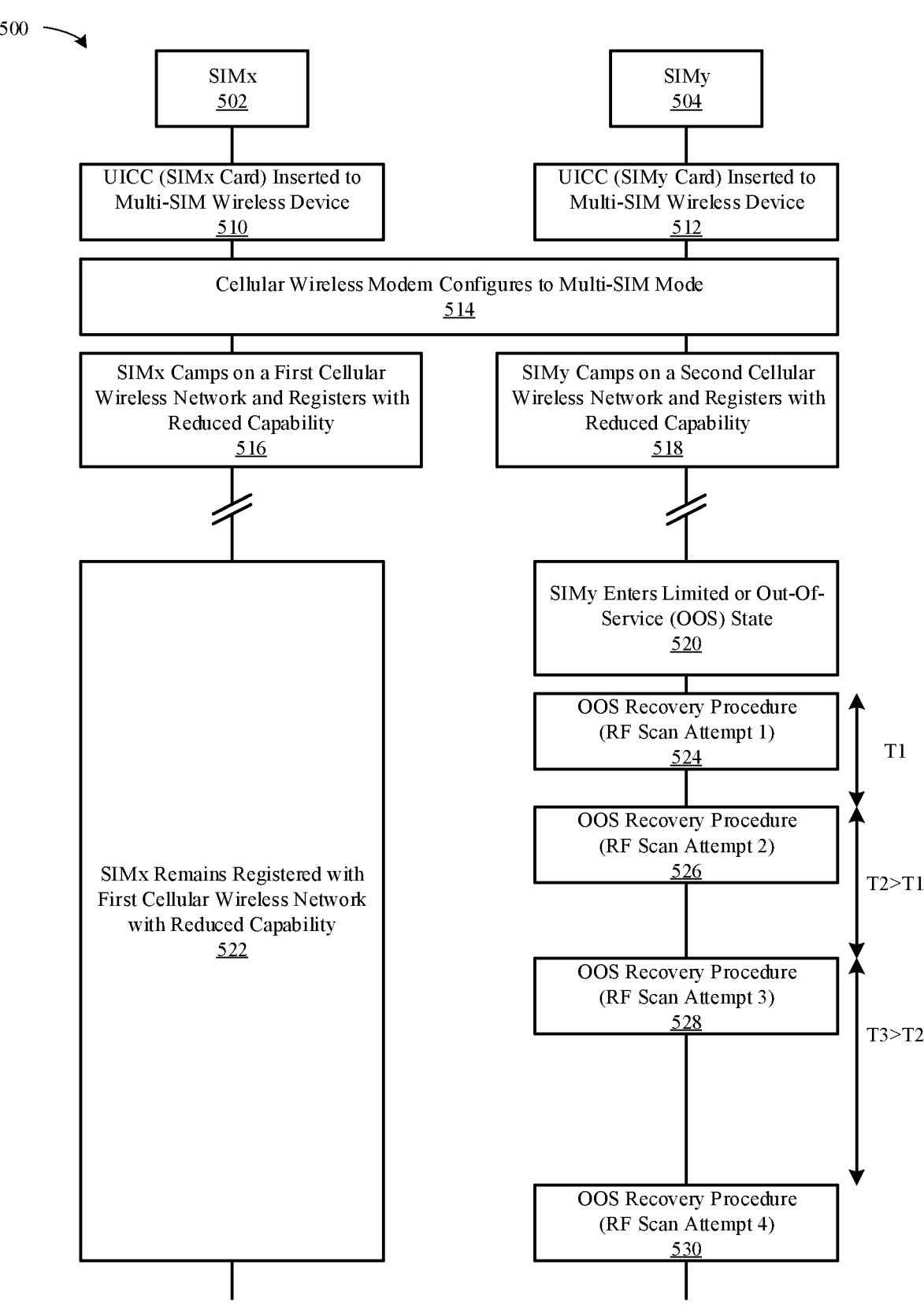
FIG. 5 illustrates a flow chart of an exemplary out-of-service (OOS) recovery procedure by a multi-SIM wireless device, according to some embodiments.

FIG. 5 illustrates a flow chart 500 of exemplary out-of-service (OOS) recovery procedure for a multi-SIM wireless device. The procedure illustrated in FIG. 5 uses two SIMs, SIMx 502 and SIMy 504, as a representative example; however, the same actions apply to use of any combination of SIMs and/or eSIMs 208 by a multi-SIM/eSIM wireless device (which can be embodied in any of the configurations described herein, such as multi-SIM/eSIM wireless devices 320, 322,326, 328). At 510, a UICC 118 that includes SIMx 502 is inserted to the multi-SIM wireless device. At 512, a UICC 118 that includes SIMy 504 is inserted to the multi-SIM wireless device. (Equivalently, one or more eSIMs 208 can be installed and enabled within an eUICC 108 of a multi-SIM/eSIM wireless device.) With two active SIMs, SIMx and SIMy, installed, at 514, a cellular wireless modem of the multi-SIM wireless device is configured to use a multi-SIM mode. At 516, a cellular wireless protocol SW stack for SIMx camps on a first cellular wireless network and registers with the first cellular wireless network including providing cellular device capabilities for SIMx to the first cellular wireless network indicating a reduced capability. At 518, a cellular wireless protocol SW stack for SIMy camps on a second cellular wireless network and registers with the second cellular wireless network including providing cellular device capabilities for SIMy to the second cellular wireless network indicating a reduced capability. In some embodiments, the reduced capability can indicate a number of component carriers supported by the multi-SIM wireless device for SIMx or SIMy that is fewer than would be usable when operating in a single-SIM mode with only SIMx or SIMy active on the multi-SIM wireless device. In some embodiments, the reduced capability can indicate a reduced number of MIMO layers for each component carrier when operating in a multi-SIM mode compared to when operating in a single-SIM mode. In some embodiments, the reduced capability can indicate a narrower maximum radio frequency (RF) bandwidth (or a smaller total RF bandwidth) in the multi-SIM mode compared to the single-SIM mode. Hardware limitations and/or available computing resources of the multi-SIM wireless device can determine a maximum capability configuration that can be used based on the number of active SIMs in the multi-SIM wireless device. Fewer active SIMs can permit each cellular wireless protocol SW stack of the cellular wireless modem access to more resources, while more active SIMs can allow each cellular wireless SW stack of the cellular wireless modem access to less resources. While operating in the multi-SIM mode, cellular wireless radio conditions for the multi-SIM wireless device can change so that, at 520, SIMy enters a limited service state, in which emergency services are accessible but regular cellular wireless services are not accessible, or an out-of-service (OOS) state, in which cellular wireless access for any service is not available. The cellular wireless protocol SW stack for SIMy can initiate an OOS recovery procedure to search for an available, suitable cellular wireless network with which to connect via SIMy. The OOS recovery procedure can be performed when SIMy is in the limited service state or in the OOS state. The OOS recovery procedure can include multiple RF scans for cellular wireless networks performed at increasing time intervals, which can be based on an OOS recovery timer. For example, at 524, the cellular wireless protocol SW stack for SIMy performs a first RF scan, followed by a second RF scan, at 526, a third RF scan, at 528, and a fourth RF scan, at 530, with increasing time intervals between successive RF scans. At 522, SIMx remains registered with the first cellular wireless network with the reduced capability configuration, which includes time when SIMy is in the limited service state or the OOS state. While the cellular wireless software stack for SIMy can require resources, e.g., computing resources and/or access to particular hardware, to perform the RF scans for the OOS recovery procedure, each successive RF scan is separated by increasingly long time intervals, during which the cellular wireless software stack for SIMy does not require substantial resources. The cellular wireless protocol software stack for SIMx, however, does not have access to additional resources available (outside of the RF scan attempts), as SIMx remains registered with the reduced capability. This procedure disadvantageously limits access to resources for SIMx when SIMy is in the limited service state or the OOS state.

Figure 6A:
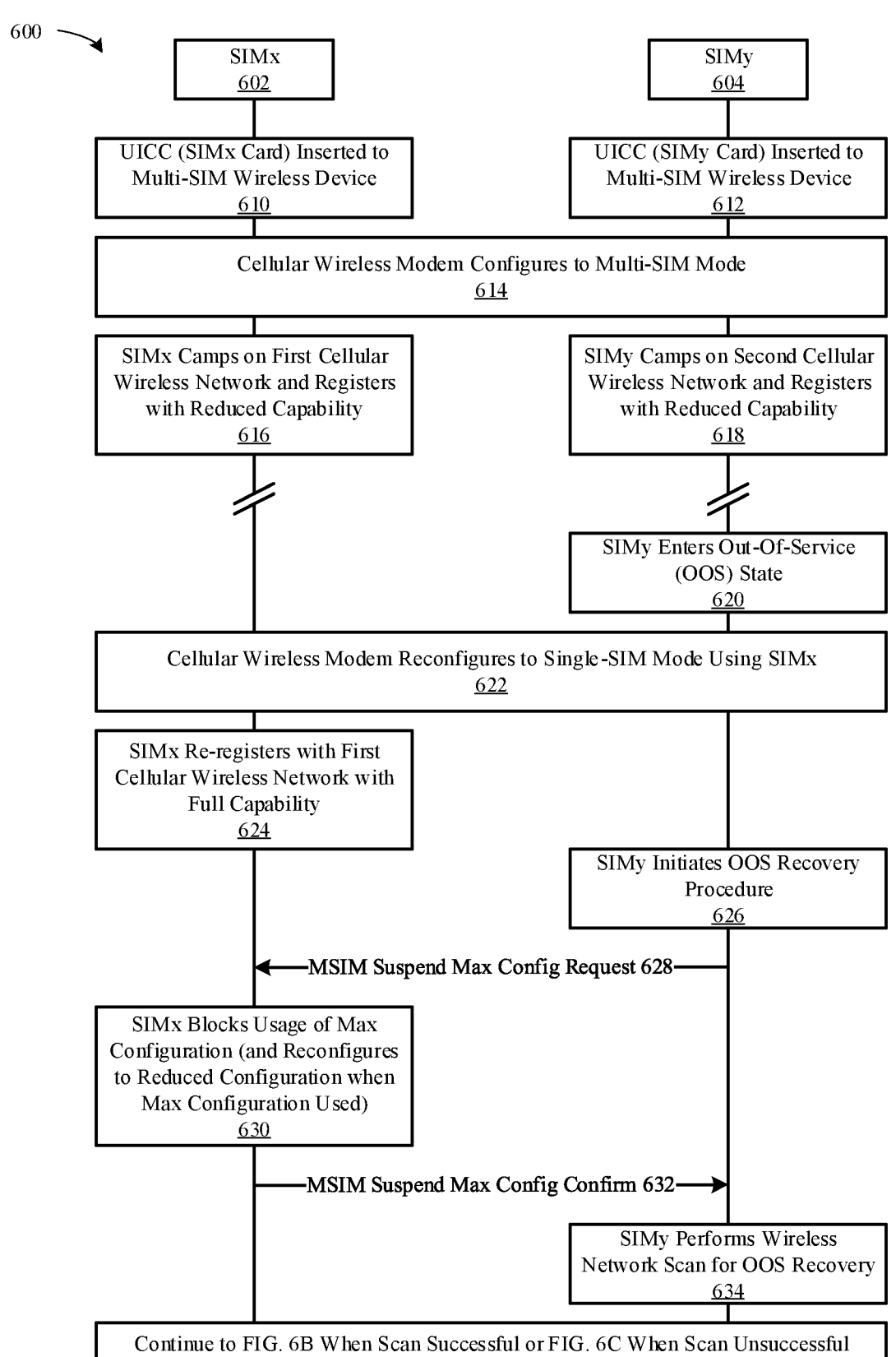

FIG. 6A illustrates a flow chart 600 of a first part of an exemplary dynamic device capability procedure by a multi-SIM wireless device. The procedure illustrated in FIG. 6A uses two SIMs, SIMx 602 and SIMy 604, as a representative example; however, the same actions apply to use of any combination of SIMs and/or eSIMs 208 by a multi-SIM/eSIM wireless device (which can be embodied in any of the configurations described herein, such as multi-SIM/eSIM wireless devices 320, 322,326, 328). At 610, a UICC 118 that includes SIMx 602 is inserted to the multi-SIM wireless device. At 612, a UICC 118 that includes SIMy 604 is inserted to the multi-SIM wireless device. (Equivalently, one or more eSIMs 208 can be installed and enabled within an eUICC 108 of a multi-SIM/eSIM wireless device.) With two active SIMs, SIMx and SIMy, installed, at 614, a cellular wireless modem of the multi-SIM wireless device is configured to use a multi-SIM mode. At 616, a cellular wireless protocol SW stack for SIMx camps on a first cellular wireless network and registers with the first cellular wireless network including providing cellular device capabilities for SIMx to the first cellular wireless network indicating a reduced capability. At 618, a cellular wireless protocol SW stack for SIMy camps on a second cellular wireless network and registers with the second cellular wireless network including providing cellular device capabilities for SIMy to the second cellular wireless network indicating a reduced capability. In some embodiments, the reduced capability can indicate a number of component carriers supported by the multi-SIM wireless device for SIMx or SIMy that is fewer than would be usable when operating in a single-SIM mode with only SIMx or SIMy active on the multi-SIM wireless device. In some embodiments, the reduced capability can indicate a reduced number of MIMO layers for each component carrier when operating in a multi-SIM mode compared to when operating in a single-SIM mode. In some embodiments, the reduced capability can indicate a narrower maximum radio frequency (RF) bandwidth in the multi-SIM mode compared to the single-SIM mode. Hardware limitations and/or available computing resources of the multi-SIM wireless device can determine a maximum capability configuration that can be used based on the number of active SIMs in the multi-SIM wireless device. Fewer active SIMs can permit each cellular wireless protocol SW stack of the cellular wireless modem access to more resources, while more active SIMs can allow each cellular wireless SW stack of the cellular wireless modem access to less resources. While operating in the multi-SIM mode, cellular wireless radio conditions for the multi-SIM wireless device can change so that, at 620, SIMy enters an out-of-service (OOS) state in which cellular wireless access for any service is not available. In some embodiments, SIMy enters the OOS state, and the cellular wireless modem for the multi-SIM/eSIM wireless device does not cause SIMy to enter a limited service state. Instead, the cellular wireless modem for the multi-SIM/eSIM wireless device uses SIMx if require for emergency services connections. The cellular wireless protocol SW stack for SIMy can initiate an OOS recovery procedure to search for an available, suitable cellular wireless network with which to connect via SIMy. At 622, the cellular wireless modem of the multi-SIM wireless device reconfigures to a single-SIM mode using SIMx. At 624, the cellular wireless protocol SW stack for SIMx re-registers with the first cellular wireless network and provides cellular device capabilities for SIMx to the first cellular wireless network indicating a full capability. In some embodiments, the full capability can indicate a number of component carriers supported by the multi-SIM wireless device for SIMx that is more than indicated previously for SIMx when configured with reduced capability. In some embodiments, the full capability can indicate a larger number of MIMO layers for each component carrier when operating in a single-SIM mode compared to when operating in a multi-SIM mode. In some embodiments, the full capability can indicate a wider maximum radio frequency (RF) bandwidth (or a larger total RF bandwidth) in the single-SIM mode compared to the multi-SIM mode. At 626, initiates an OOS recovery procedure, which can include one or more RF scans for available and suitable cellular wireless networks for SIMy. RF scanning for cellular wireless networks can require substantial resources, e.g., computing resources and access to particular hardware components, such as when receiving cellular wireless signals at different frequencies and/or from different cellular wireless networks in parallel. In some cases, the multi-SIM wireless device is not able to support a maximum configuration (e.g., a maximum number of component carriers, a maximum number of MIMO layers per component carrier, and/or a maximum RF bandwidth) for the cellular wireless protocol SW stack for SIMx when performing the RF scanning as part of the OOS recovery procedure for the cellular wireless protocol SW stack for SIMy. To ensure sufficient resources are available for the cellular wireless protocol SW stack for SIMy to perform the RF scanning, the cellular wireless protocol SW stack for SIMy sends a message, e.g., a multi-SIM (MSIM) suspend maximum configuration request message, at 628, to the cellular wireless protocol SW stack of SIMx. At 630, the cellular wireless protocol SW stack for SIMx can block use of the maximum configuration and reconfigure to a reduced configuration from the maximum configuration if required. If SIMx is in an idle state (i.e., not in a connected state with the first cellular wireless network), or is in a connected state but not using a maximum configuration, the cellular wireless protocol SW stack for SIMx can reply to the request message with an MSIM suspend maximum configuration confirmation message at 632. If SIMx is in a connected state using a maximum configuration upon receipt of the MSIM suspend maximum configuration request message from the cellular wireless protocol SW stack for SIMy, the cellular wireless protocol SW stack for SIMx can wait until the maximum configuration is no longer in use before sending the MSIM suspend maximum configuration confirmation message to SIMy. In some embodiments, the cellular wireless protocol SW stack for SIMx reconfigures from using the maximum configuration to using a configuration other than the maximum configuration, e.g., a reduced configuration, before sending the MSIM suspend maximum configuration confirmation message to SIMy. Although SIMx blocks use of a maximum configuration and may reconfigure to a reduced capability configuration, the cellular wireless protocol SW stack for SIMx does not re-register with the first cellular wireless network with a reduced capability indication and instead remains registered with the full capability. While blocking use of the maximum configuration, the cellular wireless protocol SW stack for SIMx can disallow requesting the maximum configuration for communication with the first cellular wireless network or from accepting a request for the maximum configuration received from the first cellular wireless network. After receipt of the MSIM suspend maximum configuration confirmation message from SIMx, the cellular wireless protocol SW stack for SIMy performs a wireless network scan at 634 as part of the OOS recovery procedure. By blocking the maximum configuration for SIMx, the multi-SIM wireless modem makes available resources for SIMy to perform RF scans to recover from the OOS state. By remaining registered with full capability with the first cellular wireless network, SIMx can use resources that would otherwise be assigned to SIMy when SIMy does not require the resources to perform the RF scans. The procedure illustrated in FIG. 6A continues to FIG. 6B when the RF scan performed at 634 is successful or continues to FIG. 6C when the RF scan performed at 634 is not successful.

FIG. 6B illustrates a flow chart 640 of a second part of the exemplary dynamic device capability procedure performed by the multi-SIM wireless device following from FIG. 6A when the RF scan for an available suitable cellular wireless network for SIMy is successful. At 642, the cellular wireless protocol SW stack for SIMy succeeds in locating cellular wireless network for SIMy. At 644, the cellular wireless protocol SW stack for SIMy sends a multi-SIM (MSIM) configuration update request message to the cellular wireless protocol SW stack for SIMx. The cellular wireless modem for the multi-SIM wireless device, at 646, reconfigures from the single-SIM state for SIMx to a multi-SIM state for SIMx and SIMy. At 648, the cellular wireless protocol SW stack for SIMx re-registers with the first cellular wireless network including providing cellular device capabilities for SIMx to the first cellular wireless network indicating a reduced capability. At 650, the cellular wireless protocol SW stack for SIMy camps on the second (or a third) cellular wireless network and registers with the second (or third) cellular wireless network including providing cellular device capabilities for SIMy to the second (or third) cellular wireless network indicating a reduced capability. The cellular wireless network for SIMy found during the OOS recovery procedure may be a different cellular wireless network than previously used by SIM before entering the OOS state.

Figure 6C:
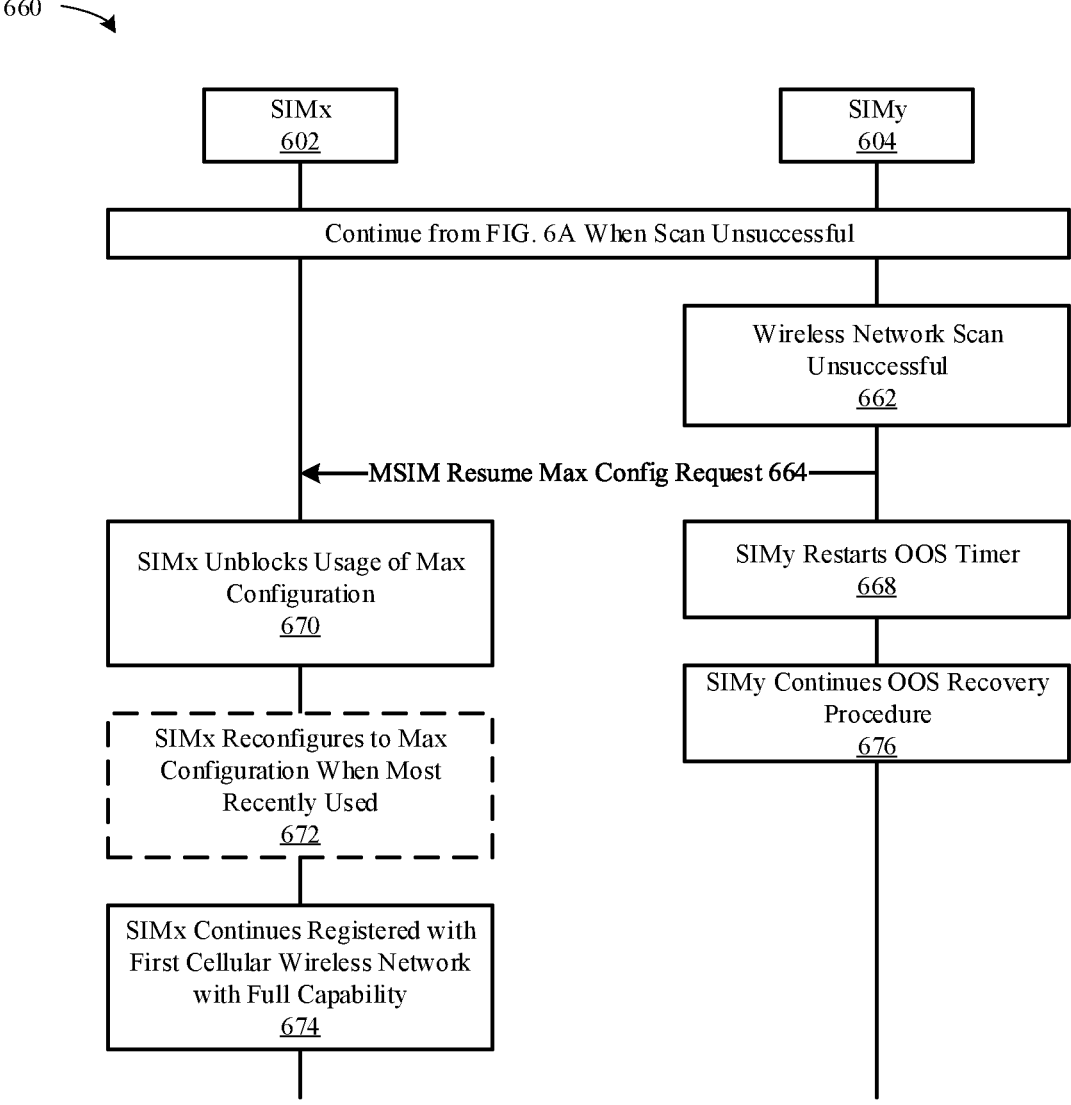

FIG. 6C illustrates a flow chart 660 of a third part of the exemplary dynamic device capability procedure performed by the multi-SIM wireless device following from FIG. 6A when the RF scan for an available suitable cellular wireless network for SIMy is not successful. At 662, the cellular wireless protocol SW stack for SIMy does not succeed in locating cellular wireless network for SIMy based on the most recent RF scan. At 664, the cellular wireless protocol SW stack for SIMy sends to the cellular wireless protocol SW stack for SIMx a multi-SIM (MSIM) resume maximum configuration request message. At 670, the cellular wireless protocol SW stack for SIMx unblocks use of the maximum configuration for SIMx. In some embodiments, at 672, the cellular wireless protocol SW stack for SIMx reconfigures to the maximum configuration when previously, most recently used for SIMx prior to the blocking of the maximum configuration. At 668, SIMy remains in the OOS state, at the cellular wireless protocol SW stack for SIMy restarts an OOS timer and continues the OOS recovery procedure at 676. At 674, SIMx continues to be registered with the first cellular wireless network with full capability, unchanged throughput the OOS recovery procedure for SIMy until a change from the single SIM mode to the multi-SIM mode for the cellular wireless modem occurs. Upon subsequent expiration of the OOS timer, the procedure illustrated in FIG. 6A, from 626 to 634, repeats, and again the procedure branches to FIG. 6B or FIG. 6C depending on the result of the most recent RF scan.

FIG. 7 illustrates a flow chart 700 of an exemplary method for dynamic device capability performed by a baseband component 110 of a multi-SIM/eSIM wireless device. At 702, the baseband component 110 detects an out-of-service (OOS) condition for a second SIM/eSIM of multiple active SIMs/eSIMs that also includes a first SIM/eSIM in the multi-SIM/eSIM wireless device. At 704, the baseband component 110 reconfigures, responsive to detecting the OOS condition for the second SIM/eSIM, a cellular wireless modem of the multi-SIM/eSIM wireless device from a multi-SIM/eSIM state using the first SIM/eSIM and the second SIM/eSIM to a single SIM/eSIM state using the first SIM/eSIM. At 706, the baseband component 110 detects initiation of an OOS radio frequency (RF) scan procedure for the second SIM/eSIM. At 708, the baseband component 110 blocks use of a maximum capability configuration for the first SIM/eSIM during the OOS RF scan procedure. At 710, when the OOS RF scan procedure successfully detects a cellular wireless network for the second SIM/eSIM, the baseband component 110 reconfigures the cellular wireless modem of the multi-SIM/eSIM wireless device from the single SIM/eSIM state using the first SIM/eSIM to the multi-SIM/eSIM state using the first SIM/eSIM and the second SIM/eSIM, where the cellular wireless modem is restricted to a reduced capability configuration for each active SIM/eSIM while configured in the multi-SIM/eSIM state. At 712, when the OOS RF scan procedure is unsuccessful, the baseband component 110 allows use of the maximum capability configuration for the first SIM/eSIM.

In some embodiments, the method further includes the baseband component 110 of the multi-SIM/eSIM wireless device, subsequent to reconfiguring the cellular wireless modem to the multi-SIM/eSIM state, i) sending, to a first cellular wireless network associated with the first SIM/eSIM, a first message indicating the reduced capability configuration of the first SIM/eSIM, and ii) sending, to a second cellular wireless network associated with the second SIM/eSIM, a second message indicating the reduced capability configuration of the second SIM/eSIM. In some embodiments, the method further includes the baseband component 110 of the multi-SIM/eSIM wireless device, after detecting initiation of the OOS RF scan procedure, i) determining the first SIM/eSIM is configured with the maximum capability configuration, and ii) delaying scanning for cellular wireless networks for the second SIM/eSIM until the first SIM/eSIM is no longer configured with the maximum capability configuration. In some embodiments, the reduced capability configuration includes fewer component carriers available to each active SIM/eSIM than supported by the multi-SIM/eSIM wireless device when using a single active SIM/eSIM. In some embodiments, the reduced capability configuration includes fewer multiple-input multiple-output (MIMO) layers for each component carrier of each active SIM/eSIM than supported by the multi-SIM/eSIM wireless device when using a single active SIM/eSIM. In some embodiments, the maximum capability configuration for the first SIM/eSIM includes use of a maximum number of component carriers by the first SIM/eSIM. In some embodiments, the method further includes the baseband component 110 of the multi-SIM/eSIM wireless device, after detecting initiation of the OOS RF scan procedure, i) disallowing a limited service state for the second SIM/eSIM while in an OOS state, and ii) using the first SIM/eSIM for access to emergency services while the second SIM/eSIM is in the OOS state. In some embodiments, the baseband component of the multi-SIM/eSIM wireless device includes a first cellular wireless protocol software (SW) stack associated with the first SIM/eSIM and a second cellular wireless protocol SW stack associated with the second SIM/eSIM. In some embodiments, the method further includes the second cellular wireless protocol SW stack: i) initiating an OOS recovery timer upon detection of the OOS condition for the second SIM/eSIM, ii) sending, upon expiration of the OOS recovery timer, a first message requesting suspension of use of the maximum capability configuration for the first SIM/eSIM, and iii) waiting to scan for cellular wireless networks as part of the OOS recovery RF scan procedure until after receiving from the first cellular wireless protocol SW stack a second message confirming suspension of use of the maximum capability configuration for the first SIM/eSIM. In some embodiments, the method further includes the second cellular wireless protocol SW stack sending to the first cellular wireless protocol SW stack a configuration update message indicating the OOS RF scan procedure successfully detects the cellular wireless network for the second SIM/eSIM to cause the first cellular wireless protocol SW stack to be restricted to the reduced capability configuration. In some embodiments, the method further includes the second cellular wireless protocol SW stack sending to the first cellular wireless protocol SW stack, when the OOS RF scan procedure is unsuccessful, a third message indicating the first cellular wireless protocol SW stack is allowed to use the maximum capability configuration for the first SIM/eSIM.

Representative Exemplary Apparatus

FIG. 8 illustrates in block diagram format an exemplary computing device 800 that can be used to implement the various components and techniques described herein, according to some embodiments. In particular, the detailed view of the exemplary computing device 800 illustrates various components that can be included in the wireless device 102. As shown in FIG. 8, the computing device 800 can include one or more processors 802 that represent microprocessors or controllers for controlling the overall operation of computing device 800. In some embodiments, the computing device 800 can also include a user input device 808 that allows a user of the computing device 800 to interact with the computing device 800. For example, in some embodiments, the user input device 808 can take a variety of forms, such as a button, keypad, dial, touch screen, audio input interface, visual/image capture input interface, input in the form of sensor data, etc. In some embodiments, the computing device 800 can include a display 810 (screen display) that can be controlled by the processor(s) 802 to display information to the user (for example, information relating to incoming, outgoing, or active communication sessions). A data bus 816 can facilitate data transfer between at least a storage device 840, the processor(s) 802, and a controller 813. The controller 813 can be used to interface with and control different equipment through an equipment control bus 814. The computing device 800 can also include a network/bus interface 811 that couples to a data link 812. In the case of a wireless connection, the network/bus interface 811 can include wireless circuitry, such as a wireless transceiver and/or baseband component. The computing device 800 can also include a secure element 824. The secure element 824 can include an eUICC 108 and/or one or more UICCs 118.

The computing device 800 also includes a storage device 840, which can include a single storage or a plurality of storages (e.g., hard drives and/or solid-state drives), and includes a storage management module that manages one or more partitions within the storage device 840. In some embodiments, storage device 840 can include flash memory, semiconductor (solid state) memory or the like. The computing device 800 can also include a Random-Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of the computing device 800.

Wireless Terminology

In accordance with various embodiments described herein, the terms "wireless communication device," "wireless device," "mobile device," "mobile station," "mobile wireless device," and "user equipment" (UE) may be used interchangeably herein to describe one or more consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near-field communication (NFC), a cellular wireless network, a fourth generation (4G) LTE, LTE Advanced (LTE-A), 5G, and/or 6G or other present or future developed advanced cellular wireless networks.

The wireless device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless devices that are also capable of communicating via different radio access technologies (RATs). In these scenarios, a multi-mode user equipment (UE) can be configured to prefer attachment to a 5G wireless network offering faster data rate throughput, as compared to other 4G LTE legacy networks offering lower data rate throughputs. For instance, in some implementations, a multi-mode UE may be configured to fall back to a 4G LTE network or a 3G legacy network, e.g., an Evolved High Speed Packet Access (HSPA+) network or a Code Division Multiple Access (CDMA) 2000 Evolution-Data Only (EV-DO) network, when 5G wireless networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for dynamic device capability by a wireless device, the method comprising:

by a baseband component of the wireless device:

detecting an out-of-service (OOS) condition for a second subscriber identity module (SIM) or electronic SIM (eSIM) of a plurality of active SIMs and/or eSIMs in the wireless device, wherein the plurality of active SIMs and/or eSIMs includes a first SIM or eSIM;

reconfiguring, responsive to detecting the OOS condition for the second SIM or eSIM, a cellular wireless modem of the wireless device from a multiple SIM and/or eSIM state using the first SIM or eSIM and the second SIM or eSIM to a single SIM or eSIM state using the first SIM or eSIM;

detecting, while configured in the single SIM or eSIM state using the first SIM or eSIM, initiation of an OOS radio frequency (RF) scan procedure for the second SIM or eSIM;

blocking, while configured in the single SIM or eSIM state using the first SIM or eSIM, use of a maximum capability configuration for the first SIM or eSIM during the OOS RF scan procedure; and when the OOS RF scan procedure successfully detects a cellular wireless network for the second SIM or eSIM, reconfiguring the cellular wireless modem of the wireless device from the single SIM or eSIM state using the first SIM or eSIM to the multiple SIM and/or eSIM state using the first SIM or eSIM and the second SIM or eSIM, wherein:

the cellular wireless modem is restricted to a reduced capability configuration for each active SIM or eSIM while configured in the multiple SIM and/or eSIM state, wherein the reduced capability configuration comprises:

fewer component carriers available to each active SIM or eSIM than supported by the wireless device when using a single active SIM or eSIM, or fewer multiple-input multiple-output (MIMO) layers for each component carrier of each active SIM or eSIM than supported by the wireless device when using a single active SIM or eSIM.

2. The method of claim 1, further comprising:

by the baseband component of the wireless device:

when the OOS RF scan procedure is unsuccessful, allowing use of the maximum capability configuration for the first SIM or eSIM.

3. The method of claim 1, further comprising:

by the baseband component of the wireless device subsequent to reconfiguring the cellular wireless modem to the multiple SIM and/or eSIM state from the single SIM or eSIM state:

sending, to a first cellular wireless network associated with the first SIM or eSIM, a first message indicating the reduced capability configuration of the first SIM or eSIM; and sending, to a second cellular wireless network associated with the second SIM or eSIM, a second message indicating the reduced capability configuration of the second SIM or eSIM.

4. The method of claim 1, further comprising:

by the baseband component of the wireless device after the detecting initiation of the OOS RF scan procedure:

determining the first SIM or eSIM is configured with the maximum capability configuration; and delaying scanning for cellular wireless networks for the second SIM or eSIM until the first SIM or eSIM is no longer configured with the maximum capability configuration.

5. The method of claim 1, wherein the reduced capability configuration comprises fewer component carriers available to each active SIM or eSIM than supported by the wireless device when using a single active SIM or eSIM.

6. The method of claim 1, wherein the reduced capability configuration comprises fewer multiple-input multiple-output (MIMO) layers for each component carrier of each active SIM or eSIM than supported by the wireless device when using a single active SIM or eSIM.

7. The method of claim 1, wherein the maximum capability configuration for the first SIM or eSIM comprises use of a maximum number of component carriers by the first SIM or eSIM.

8. The method of claim 1, further comprising:

by the baseband component of the wireless device after the detecting initiation of the OOS RF scan procedure:

disallowing a limited service state for the second SIM or eSIM while in an OOS state; and using the first SIM or eSIM for access to emergency services while the second SIM or eSIM is in the OOS state.

9. The method of claim 1, wherein:

the baseband component of the wireless device comprises a first cellular wireless protocol software (SW) stack associated with the first SIM or eSIM and a second cellular wireless protocol SW stack associated with the second SIM or eSIM; and the method further comprises:

by the second cellular wireless protocol SW stack:

initiating an OOS recovery timer upon detection of the OOS condition for the second SIM or eSIM;

sending, upon expiration of the OOS recovery timer, a first message requesting suspension of use of the maximum capability configuration for the first SIM or eSIM; and waiting to scan for cellular wireless networks as part of the OOS RF scan procedure until after receiving from the first cellular wireless protocol SW stack a second message confirming suspension of use of the maximum capability configuration for the first SIM or eSIM.

10. The method of claim 9, further comprising:

sending, by the second cellular wireless protocol SW stack to the first cellular wireless protocol SW stack, a configuration update message indicating the OOS RF scan procedure successfully detects the cellular wireless network for the second SIM or eSIM to cause the first cellular wireless protocol SW stack to be restricted to the reduced capability configuration.

11. The method of claim 9, further comprising:

sending, by the second cellular wireless protocol SW stack to the first cellular wireless protocol SW stack when the OOS RF scan procedure is unsuccessful, a third message indicating the first cellular wireless protocol SW stack is allowed to use the maximum capability configuration for the first SIM or eSIM.

12. A wireless device configured for dynamic device capability, the wireless device comprising:

a first subscriber identity module (SIM) or electronic SIM (eSIM);

a second SIM or eSIM;

and a baseband component configured to:

implement a cellular wireless modem using the first SIM or eSIM and the second SIM or eSIM;

detect an out-of-service (OOS) condition for the second SIM or eSIM while configured in a multiple SIM and/or eSIM state using the first SIM or eSIM and the second SIM or eSIM;

reconfigure, responsive to detecting the OOS condition for the second SIM or eSIM, a cellular wireless modem of the wireless device from the multiple SIM and/or eSIM state using the first SIM or eSIM and the second SIM or eSIM to a single SIM or eSIM state using the first SIM or eSIM;

detect, while configured in the single SIM or eSIM state using the first SIM or eSIM, initiation of an OOS radio frequency (RF) scan procedure for the second SIM or eSIM;

block, while configured in the single SIM or eSIM state using the first SIM or eSIM, use of a maximum capability configuration for the first SIM or eSIM during the OOS RF scan procedure; and when the OOS RF scan procedure successfully detects a cellular wireless network for the second SIM or eSIM, reconfigure the cellular wireless modem of the wireless device from the single SIM or eSIM state using the first SIM or eSIM to the multiple SIM and/or eSIM state using the first SIM or eSIM and the second SIM or eSIM, wherein:

the cellular wireless modem is restricted to a reduced capability configuration for the first SIM or eSIM and the second SIM or eSIM while configured in the multiple SIM and/or eSIM state, wherein the reduced capability configuration comprises:

fewer component carriers available to each active SIM or eSIM than supported by the wireless device when using a single active SIM or eSIM, or fewer multiple-input multiple-output (MIMO) layers for each component carrier of each active SIM or eSIM than supported by the wireless device when using a single active SIM or eSIM.

13. The wireless device of claim 12, wherein the baseband component is further configured to:

allow use of the maximum capability configuration for the first SIM or eSIM when the OOS RF scan procedure is unsuccessful.

14. The wireless device of claim 12, wherein the baseband component is further configured to, subsequent to reconfiguring the cellular wireless modem to the multiple SIM and/or eSIM state:

send, to a first cellular wireless network associated with the first SIM or eSIM, a first message indicating the reduced capability configuration of the first SIM or eSIM; and send, to a second cellular wireless network associated with the second SIM or eSIM, a second message indicating the reduced capability configuration of the second SIM or eSIM.

15. The wireless device of claim 12, wherein the baseband component is further configured to, after detecting initiation of the OOS RF scan procedure:

determine the first SIM or eSIM is configured with the maximum capability configuration; and delay scanning for cellular wireless networks for the second SIM or eSIM until the first SIM or eSIM is no longer configured with the maximum capability configuration.

16. The multi SIM/eSIM wireless device of claim 12, wherein the reduced capability configuration comprises fewer component carriers available to each active SIM or eSIM than supported by the wireless device when using a single active SIM or eSIM.

17. The wireless device of claim 12, wherein the reduced capability configuration comprises fewer multiple-input multiple-output (MIMO) layers for each component carrier of each active SIM or eSIM than supported by the wireless device when using a single active SIM or eSIM.

18. The wireless device of claim 12, wherein the maximum capability configuration for the first SIM or eSIM comprises use of a maximum number of component carriers by the first SIM or eSIM.

19. The wireless device of claim 12, wherein the baseband component is further configured to, after detecting initiation of the OOS RF scan procedure:

disallow a limited service state for the second SIM or eSIM while in an OOS state; and use the first SIM or eSIM for access to emergency services while the second SIM or eSIM is in the OOS state.

20. A non-transitory computer-readable medium storing instructions for dynamic device capability by a wireless device, the instructions comprising:

instructions for detecting an out-of-service (OOS) condition for a second subscriber identity module (SIM) or electronic SIM (eSIM) of a plurality of active SIMs and/or eSIMs in the wireless device, wherein the plurality of active SIMs and/or eSIMs includes a first SIM or eSIM;

instructions for reconfiguring, responsive to detecting the OOS condition for the second SIM or eSIM, a cellular wireless modem of the wireless device from a multiple SIM and/or eSIM state using the first SIM or eSIM and the second SIM or eSIM to a single SIM or eSIM state using the first SIM or eSIM;

instructions for detecting, while configured in the single SIM or eSIM state using the first SIM or eSIM, initiation of an OOS radio frequency (RF) scan procedure for the second SIM or eSIM;

instructions for blocking, while configured in the single SIM or eSIM state using the first SIM or eSIM, use of a maximum capability configuration for the first SIM or eSIM during the OOS RF scan procedure; and instructions for, when the OOS RF scan procedure successfully detects a cellular wireless network for the second SIM or eSIM, reconfiguring the cellular wireless modem of the wireless device from the single SIM or eSIM state using the first SIM or eSIM to the multiple SIM and/or eSIM state using the first SIM or eSIM and the second SIM or eSIM, wherein:

the cellular wireless modem is restricted to a reduced capability configuration for each active SIM or eSIM while configured in the multiple SIM and/or eSIM state, wherein the reduced capability configuration comprises:

fewer component carriers available to each active SIM or eSIM than supported by the wireless device when using a single active SIM or eSIM, or fewer multiple-input multiple-output (MIMO) layers for each component carrier of each active SIM or eSIM than supported by the wireless device when using a single active SIM or eSIM.

* * * * *